United States Patent
Shima

(10) Patent No.: US 11,190,944 B2
(45) Date of Patent: Nov. 30, 2021

(54) SPECTRAL SENSING AND ALLOCATION USING DEEP MACHINE LEARNING

(71) Applicant: Ball Aerospace & Technologies Corp., Boulder, CO (US)

(72) Inventor: James Michael Shima, Superior, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 57 days.

(21) Appl. No.: 15/973,003

(22) Filed: May 7, 2018

(65) Prior Publication Data

US 2018/0324595 A1 Nov. 8, 2018

Related U.S. Application Data

(60) Provisional application No. 62/501,954, filed on May 5, 2017.

(51) Int. Cl.
*H04W 16/10* (2009.01)
*H04B 7/0413* (2017.01)
(Continued)

(52) U.S. Cl.
CPC .......... *H04W 16/10* (2013.01); *G06N 3/0454* (2013.01); *G06N 3/06* (2013.01);
(Continued)

(58) Field of Classification Search
CPC .... H04B 7/0413; H04W 16/10; H04W 24/02; H04N 3/06; H04N 3/0454
(Continued)

(56) References Cited

U.S. PATENT DOCUMENTS 5,588,073 A 12/1996 Lee et al.
5,719,794 A 2/1998 Altshuler et al.
(Continued)

FOREIGN PATENT DOCUMENTS

CN 108875595 11/2018

OTHER PUBLICATIONS

International Search Report and Written Opinion for International (PCT) Patent Application No. PCT/US2018/031395, dated Jul. 30, 2018 15 pages.
(Continued)

*Primary Examiner* — Christopher M Crutchfield
*Assistant Examiner* — Jean F Voltaire
(74) *Attorney, Agent, or Firm* — Sheridan Ross P.C.

(57) ABSTRACT

Methods and systems for identifying occupied areas of a radio frequency (RF) spectrum, identifying areas within that RF spectrum that are unusable for further transmissions, and identifying areas within that RF spectrum that are occupied but that may nonetheless be available for additional RF transmissions are provided. Implementation of the method then systems can include the use of multiple deep neural networks (DNNs), such as convolutional neural networks (CNN's), that are provided with inputs in the form of RF spectrograms. Embodiments of the present disclosure can be applied to cognitive radios or other configurable communication devices, including but not limited to multiple inputs multiple output (MIMO) devices and 5G communication system devices.

20 Claims, 15 Drawing Sheets

(51) Int. Cl.
*G06N 3/06* (2006.01)
*G06N 3/04* (2006.01)
*G06N 3/08* (2006.01)
*H04W 16/14* (2009.01)
*H04W 24/02* (2009.01)

(52) U.S. Cl.
CPC ............ *G06N 3/08* (2013.01); *H04B 7/0413* (2013.01); *H04W 16/14* (2013.01); *H04W 24/02* (2013.01)

(58) Field of Classification Search
USPC ........................................................ 370/252
See application file for complete search history.

(56) References Cited

U.S. PATENT DOCUMENTS

| | | | |
|---|---|---|---|
| 5,960,391 | A | 9/1999 | Tateishi et al. |
| 6,075,991 | A | 6/2000 | Raleigh et al. |
| 6,252,627 | B1 | 6/2001 | Frame et al. |
| 6,437,692 | B1 | 8/2002 | Petite et al. |
| 6,597,394 | B1 | 7/2003 | Duncan et al. |
| 6,820,053 | B1 | 11/2004 | Ruwisch |
| 7,020,501 | B1 | 3/2006 | Elliott et al. |
| 7,590,098 | B2 | 9/2009 | Ganesh |
| 8,019,544 | B2 | 9/2011 | Needelman et al. |
| 8,583,371 | B1 | 11/2013 | Goodzeit et al. |
| 8,929,936 | B2 | 1/2015 | Mody et al. |
| 9,073,648 | B2 | 7/2015 | Tsao et al. |
| 9,191,587 | B2 | 11/2015 | Wright et al. |
| 9,294,365 | B2 | 3/2016 | Misra et al. |
| 9,449,374 | B2 | 9/2016 | Nash et al. |
| 9,702,702 | B1 | 7/2017 | Lane et al. |
| 9,924,522 | B2 | 3/2018 | Gulati et al. |
| 9,927,510 | B2 | 3/2018 | Waldron et al. |
| 10,021,313 | B1 | 7/2018 | Chen et al. |
| 10,048,084 | B2 | 8/2018 | Laine et al. |
| 10,271,179 | B1 | 4/2019 | Shima |
| 10,970,520 | B1 | 4/2021 | Kim et al. |
| 2005/0049876 | A1 | 3/2005 | Agranat |
| 2005/0228660 | A1 | 10/2005 | Schweng |
| 2006/0030332 | A1 | 2/2006 | Carrott et al. |
| 2007/0010956 | A1 | 1/2007 | Nerguizian et al. |
| 2008/0020354 | A1 | 1/2008 | Goree et al. |
| 2008/0045235 | A1 | 2/2008 | Kennedy et al. |
| 2008/0293353 | A1* | 11/2008 | Mody .................... H04K 3/226 455/1 |
| 2009/0179142 | A1 | 7/2009 | Duparre et al. |
| 2009/0197550 | A1 | 8/2009 | Huttunen et al. |
| 2009/0268619 | A1 | 10/2009 | Dain et al. |
| 2010/0091017 | A1 | 4/2010 | Kmiecik et al. |
| 2012/0071105 | A1* | 3/2012 | Walker .................... G01S 7/021 455/67.11 |
| 2012/0072986 | A1* | 3/2012 | Livsics .................. H04B 1/719 726/22 |
| 2012/0163355 | A1 | 6/2012 | Heo et al. |
| 2012/0167144 | A1 | 6/2012 | Avison-Fell |
| 2012/0202510 | A1 | 8/2012 | Singh |
| 2012/0238201 | A1 | 9/2012 | Du et al. |
| 2012/0238220 | A1* | 9/2012 | Du ........................ H04B 17/345 455/67.11 |
| 2014/0218520 | A1 | 8/2014 | Teich et al. |
| 2014/0232871 | A1 | 8/2014 | Kriel et al. |
| 2014/0282783 | A1* | 9/2014 | Totten ................. H04L 12/2885 725/111 |
| 2014/0329540 | A1* | 11/2014 | Duggan ................ G01S 5/0289 455/456.1 |
| 2015/0009072 | A1 | 1/2015 | Nijsure |
| 2016/0101779 | A1 | 4/2016 | Katoh |
| 2016/0173241 | A1 | 6/2016 | Goodson et al. |
| 2016/0187477 | A1 | 6/2016 | Wang |
| 2017/0120906 | A1 | 5/2017 | Penilla et al. |
| 2017/0123429 | A1 | 5/2017 | Levinson et al. |
| 2017/0366264 | A1 | 12/2017 | Riesing et al. |
| 2018/0019910 | A1 | 1/2018 | Tsagkaris et al. |
| 2018/0025641 | A1 | 1/2018 | LaVelle et al. |
| 2018/0033449 | A1 | 2/2018 | Theverapperuma et al. |
| 2018/0053108 | A1 | 2/2018 | Olabiyi et al. |
| 2018/0082438 | A1 | 3/2018 | Simon et al. |
| 2018/0107215 | A1 | 4/2018 | Djuric et al. |
| 2018/0149730 | A1 | 5/2018 | Li et al. |
| 2018/0268571 | A1 | 9/2018 | Park et al. |
| 2018/0293893 | A1 | 10/2018 | Yang et al. |
| 2019/0049955 | A1 | 2/2019 | Yabuuchi et al. |
| 2019/0066713 | A1 | 2/2019 | Mesgarani et al. |
| 2019/0122689 | A1 | 4/2019 | Jain et al. |
| 2019/0164430 | A1 | 5/2019 | Nix |
| 2019/0213887 | A1 | 7/2019 | Kitayama et al. |
| 2019/0294108 | A1 | 9/2019 | Ozcan et al. |
| 2019/0318725 | A1 | 10/2019 | Le Roux et al. |
| 2019/0322282 | A1 | 10/2019 | Theodosis et al. |
| 2019/0353741 | A1 | 11/2019 | Bolster, Jr. et al. |
| 2019/0363430 | A1 | 11/2019 | Wang et al. |

OTHER PUBLICATIONS

U.S. Appl. No. 16/597,411, filed Oct. 9, 2019, Schmidt et al.
U.S. Appl. No. 16/668,826, filed Oct. 30, 2019, Shima.
U.S. Appl. No. 16/693,992, filed Nov. 25, 2019, Tchilian.
U.S. Appl. No. 16/745,725, filed Jan. 17, 2020, Tchilian et al.
U.S. Appl. No. 16/806,367, filed Mar. 2, 2020, Frye et al.
"Deep Learning Meets DSP: OFDM Signal Detection," KickView Tech Blog, Feb. 13, 2018, 25 pages [retrieved online from: blog.kickview.com/deep-learning-meets-dsp-ofdm-signal-detection/].
Buchheim "Astronomical Discoveries You Can Make, Too!" Springer, 2015, pp. 442-443.
Ma et al. "Attitude-correlated frames approach for a star sensor to improve attitude accuracy under highly dynamic conditions," Applied Optics, Sep. 2015, vol. 54, No. 25, pp. 7559-7566.
Ma et al. "Performance Analysis of the Attitude-correlated Frames Approach for Star Sensors," IEEE, 3rd IEEE International Workshopon Metrology for Aerospace (MetroAeroSpace), Firenze, Italy, Jun. 22-23, 2016, pp. 81-86.
Nair et al. "Accelerating Capsule Networks with Tensor Comprehensions," Princeton, May 2018, 8 pages.
Ni et al. "Attitude-correlated frames adding approach to improve signal-to-noise ratio of star image for star tracker," Optics Express, May 2019, vol. 27, No. 11, pp. 15548-15564.
Wang "Research on Pruning Convolutional Neural Network, Autoencoder and Capsule Network," before Oct. 9, 2018, 11 pages.
Wang et al. "An Optimization View on Dynamic Routing Between Capsules," ICLR 2018 Workshop, Feb. 2018, 4 pages.
International Preliminary Report on Patentability for International (PCT) Patent Application No. PCT/US2018/031395, dated Nov. 14, 2019 14 pages.
Official Action for U.S. Appl. No. 16/668,826, dated Mar. 3, 2020 10 pages.
Official Action for U.S. Appl. No. 16/668,826, dated Jul. 28, 2020 11 pages.
Notice of Allowance for U.S. Appl. No. 16/668,826, dated Nov. 3, 2020 5 pages.

* cited by examiner

SPECTRAL SENSING AND ALLOCATION USING DEEP MACHINE LEARNING

CROSS-REFERENCE TO RELATED APPLICATIONS

This application claims the benefit of U.S. Provisional Patent Application Ser. No. 62/501,954, filed May 5, 2017, the entire disclosure of which is hereby incorporated herein by reference.

FIELD

Systems and methods for sensing occupied areas of spectrum and allocating bandwidth to available areas of the spectrum using deep machine learning are provided.

BACKGROUND

Radio frequency (RF) communications have become an extremely common technique for operatively connecting communications and other devices. As a result, the radio frequency spectrum available for additional transmitters or services has become extremely limited. In addition, the need to identify available areas within the increasingly crowded RF spectrum has increased, as more and more devices rely on RF communications.

As one technique for enabling reliable transmissions within the RF spectrum, RF equipment is increasingly capable of dynamically using or allocating different portions of the spectrum based on availability. For example, software defined radio, so-called 5G communication systems, and communication systems incorporating multiple input multiple output (MIMO) architectures have been fielded or proposed. These systems can all change aspects of their radio frequency transmission and reception characteristics, for example to enable suitably high signal to noise ratios (SNRs), and to avoid interference with other devices. However, a persistent challenge in effectively using such capabilities has been determining whether a portion of the spectrum is occupied or available. In addition, techniques for detecting the status of the RF spectrum have lacked sensitivity, and have lacked finesse in determining whether a portion of the spectrum that is otherwise determined to be occupied was nonetheless available.

Conventional techniques for sensing the occupancy of the spectrum have employed energy detection. In particular, such systems have operated by determining the strength of a signal at a frequency of interest, and concluding that a channel is occupied if the detected signal at the applicable frequency or frequency band is above a threshold value. However, such systems lack sensitivity, and can fail to identify signals.

In addition, conventional techniques for identifying areas of a crowded spectrum that could be effectively utilized are ineffective, and/or are in capable of operating in real time or near real time. In particular, such systems have commonly required relatively long integration times, making them ineffective at detecting short-duration RF events. In addition, the increasing use of low probability of detection waveforms makes identifying and avoiding such signals in the spectrum using conventional techniques particularly difficult. Accordingly, the ability of even agile RF systems to fully utilize the RF available spectrum has been limited.

SUMMARY

In accordance with embodiments of the present disclosure, systems and methods are provided that utilize a learning algorithm, also referred to herein as deep learning or convolutional neural network, to enable the identification of RF signals within the RF spectrum or portions thereof. More particularly, embodiments of the present disclosure enable the detection of even low energy and low probability of detection, transient signals. Once a signal is detected, embodiments of the present disclosure provide for additional analysis. This additional analysis can include assessing a quality of a channel in which a signal has been found, to determine whether that channel can nonetheless be used for an additional signal. Alternatively or in addition, the occupied bandwidth can be analyzed, and a frequency mask that operates to identify areas of the spectrum that are unavailable can be created. These detection and analytical functions can be performed using deep learning, or deep neural network (DNN) systems, such as but not limited to convolutional neural network (CNN) systems. Embodiments of the present disclosure can be used to implement next-generation communications systems, such as but not limited to configurable RF systems, such as satellite communications or 5G communications systems, in which spectrum is allocated dynamically.

In accordance with at least some embodiments of the present disclosure, data in the form of a spectrogram or short-time Fourier transform of a RF spectrum. The imaginary and real components of the Fourier transform are fed into the inputs of a DNN system, which in accordance with at least some embodiments of the present disclosure can be implemented as a CNN system. Moreover, embodiments of the present disclosure can incorporate a number of DNN systems. For example, the components of the transform can be provided to a first DNN system that operates to detect the presence of signals within the spectrum with a high degree of sensitivity. If this first CNN system determines that a signal is present in the spectrum or in a particular area of the spectrum, the operation of one or more additional DNN systems can be triggered. For instance, an additional DNN system that analyzes the quality of the spectrum in areas indicated as being occupied, and that outputs a heat map showing levels of channel occupancy, can be provided. Alternatively or in addition, an additional DNN system can be provided that analyzes the occupied bandwidth, as identified by the first DNN system or independently, and outputs a mask that identifies areas of the spectrum that are not available. If both of the additional DNN systems are provided, they can be operated in series or in parallel. The outputs of the various DNN systems can then be applied to determine or control characteristics of a transmission of a connected device, such as a software defined radio.

Additional features and advantages of embodiments of the disclosed systems and methods will become more readily apparent from the following description, particularly when taken together with the accompanying drawings.

DETAILED DESCRIPTION

Figure 1A:
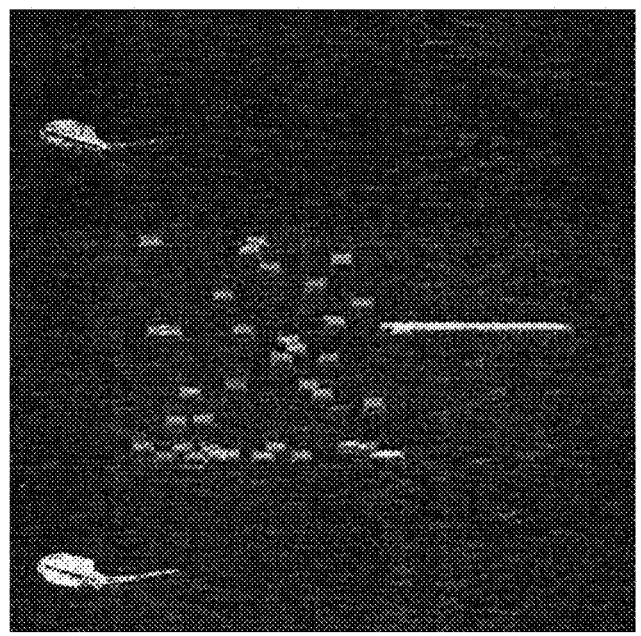
FIGS. 1A-1C illustrate example chirp spectrograms.

The technology described herein discloses systems and methods for or that facilitate dynamic channel allocation and spectrum planning by utilizing nonlinear processing methods based on state-of-the-art machine learning, also referred to herein as deep learning, deep neural network (DNN), or convolutional neural network systems. In particular, DNN systems, which can be implemented as CNN systems are combined with signal processing techniques to create novel solutions in spectral sensing, signal detection, and dynamic spectrum allocation. These techniques can be utilized in a software-defined radio (SDR) via a feedforward processing chain working in parallel with the physical layer of the radio. Feedback methods can also be leveraged to create a cooperative spectrum allocation between radios.

The flexibility of the system disclosed herein allows for generalized extensions of the processing architecture, online learning, and parameter tuning to address evolving spectrum allocation challenges. Network learning over time allows the system to adapt to spectrum allocation challenges and threats. Autonomous operation of the system is also an amenable side effect of using the disclosed machine learning techniques, removing any man-in-the-middle decision making. This also allows the system to respond in real time. The architecture can apply distributed processing to scale proportionally to the targeted communications network, since additional resources and radio links only add localized distributed computations.

Spread spectrum communications, which are able to reside below the noise floor, are low probability of detection (LPD) waveforms. This includes GPS satellite transmissions, military signaling, etc. But with the correct knowledge, the signal can be de-spread through integration over time. Observing unprocessed spectrum in these scenarios is useless for reliable signal detection. Furthermore, when looking to discover a new signal that is not expected, it is difficult to use other nonparametric techniques if the signal is 1) low in receive power, or 2) short in duration. Either, or both, of these complicates the problem of reliable detection. Consider processing SETI (Search for Extraterrestrial Intelligence) data looking for radio transmissions originating from extraterrestrial life. The amount of collected data from radio astronomy is enormous. So much so that SETI@home relies on home computers to help process all that data in the search for the "needle in the haystack". Not only is processing that data difficult, but finding a weak signal that may be also short in duration is a tenuous task using spectral techniques. For example, missing just a single detection may prove to be a monumental failure of the entire system, and most likely a user may not know about it. Signal detection theory generally looks at signals embedded in additive white Gaussian noise (AWGN). This type of noise is common in the real world and also makes the analysis tractable due to the properties of the noise process. In communication systems, Shannon's information theory proves that negative SNR communication signals (after appropriate integration) cannot be demodulated successfully (in the absence of error correction and the like). Accordingly, the detection of signals in noise depends on the signal duration, amplitude, and the corresponding noise process. This becomes more difficult if correlated noise, or interfering signals, are also in the same band as the signal you wish to detect.

In frequency-domain analysis, spectrograms (which is a non-parametric technique, meaning there may not be a-priori information on the signal model one is looking at) can be computed on the incoming time-series data. By taking the problem into the frequency domain these time-frequency grams, which are 2D pictures, the energy and phasing of a signal over some time frame in a pre-determined frequency band becomes visible. By collecting spectrograms over time, one can create a system to automatically monitor a band of interest for said events.

In one example, a busy, real-world frequency band is considered. In this scenario, one may see 1) noise, 2) other offending signals, 3) varying SNR of signals in the band. Within or among the other signals, the signal of interest that one is constantly looking for may show up. For a single sinusoid in AWGN, the periodogram (which is just one slice of a spectrogram) is the maximum likelihood detector. Finding the frequency bin with the maximum amplitude is the detected frequency. But real-world signals have a duration, which causes havoc with spectral techniques because of the inherent time-frequency product (things that last a short time in the time domain show up as high-bandwidth frequency components), spectral leakage, and scalloping. So, creating a generalized signal detector algorithm that can be applied to all situations becomes tenuous.

An example is the detection of a chirp signal. A chirp is a signal that ramps up or down in frequency over some time frame. Its frequency changes with time based on its chirp rate. The chirp is characterized by, 1) being frequency agile since it does not dwell on a single frequency very long, 2) being finite in time, making detection difficult in certain RF environments, and 3) standard Gaussian noise does not look like it. The slope of the line gives the frequency rate of change (chirp rate). Higher chirp rates traverse more bandwidth over time, hence the slope may be higher. Chirps are used in many different systems for frequency response measurements and timing. For example, RADAR uses chirp signals. Another common use is for automatic room equalization in home theater receivers, since chirps can excite a large frequency swath quickly. Chirps can also be used as "pilot" signals to denote the start of an incoming transmission.

FIG. 1A is a grayscale spectrogram of signals present in a spectrum or portion of a spectrum. Since the spectrogram consists of real numbers all >0, one can map it to a picture file by scaling the values appropriately. Therefore, one only needs a single grayscale image channel (if considering magnitude values only). In this plot, the x axis is time and the y axis is frequency. Brightness is proportional to signal magnitude (power). The example chirp in FIG. 1A may be detected with various algorithms. But reliably analyzing spectrum that contains noise and interfering signals can become difficult.

Figure 1B:
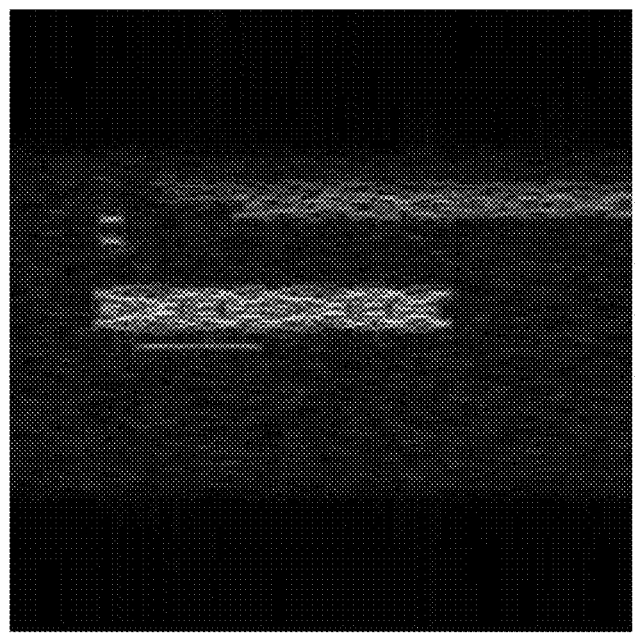

FIG. 1B illustrates an example spectrogram with several short-duration carrier waves (sinusoids) and two low-bitrate digital communication BPSK signals embedded in noise over a 4 second window. In this spectrogram there is no chirp, just lots of noise and other interfering comm signals. This is what "real-world" radio signals look like—combinations of signal classes with different strengths, all embedded in noise.

Figure 1C:
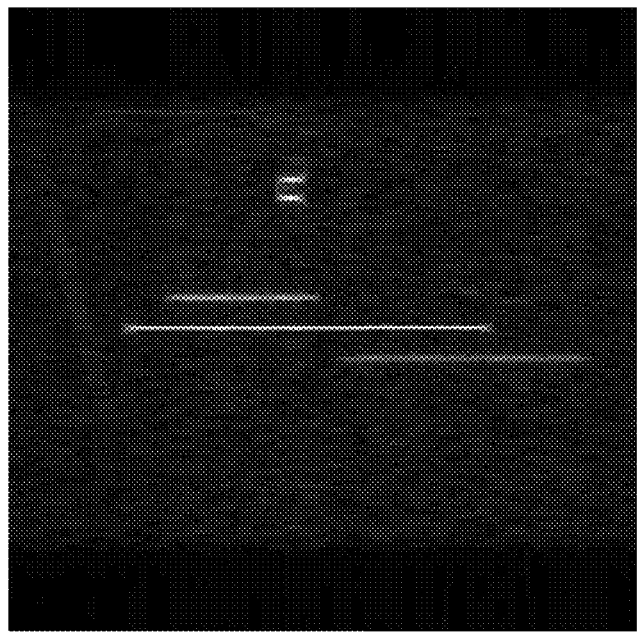

FIG. 1C illustrates another spectrogram showing noise and interfering signals that are overpowering a weak chirp signal. In FIG. 1C the chirp signal is 7 dB below the noise power in this frequency band. That is, the signal-to-noise-ratio (SNR) for the chirp is −7 dB. It is barely visible to the human eye. Classical detection methods fail consistently in detecting a weak signal like this. Moreover, since there are interfering signals that are sharing the same bandwidth as the chirp, the problem becomes even harder. The time-series data is also very noisy, one cannot even discern the start of the chirp since the noise floor hides any signal structure. In addition, some sort of structure in the signal is necessary for systems such as SETI to detect a novel signal type.

In both commercial and military communications, the overwhelming demand for data in a finite radio frequency (RF) spectrum has created a "spectrum crunch". Smart allocation of spectral resources is paramount in order to ensure efficient communications. This is even more significant in a tactical or combat environment, where communication links are vital and interference or lost transmissions can cost lives.

One such approach to handle this coordination or sharing is dynamic spectrum access (DSA). DSA networks evaluate different degrees of interaction between primary users and secondary users to control out-of-bound interference (i.e., "emissions") between the primary user's transmissions and the secondary user's transmissions. In DSA networks including underlay transmission, secondary users may communicate with each other as long as the interference measured between the primary user transmission and the secondary user transmission is below some predefined threshold. In this case, the secondary users not only assess whether primary users are transmitting but also how much interference or emissions the secondary user transmission will create and whether the secondary user's transmission will disrupt the primary user's transmission.

On the other hand, in DSA networks having overlay transmissions, the primary user and the secondary user are permitted to communicate in a cooperative fashion. Lastly, in any DSA network including both underlay transmission and the overlay transmissions, it is necessary to evaluate the impact of the presence of secondary user's transmissions on primary user transmissions to determine the overall network level efficiency of the transmission. Software Defined Radio (SDR) and Cognitive Radios (CR) have emerged as the preferred radio platform for implementing DSA nodes. SDR and CR SDR are radio that can be re-configured.

Theoretically, a CR continuously cycles through three distinct states: Observation—determining the status of the network; Decision—use of the observed data as input and determination of a disclosed optimum solution based on the inputs; and Action—defines the possibilities of action or alterations that can be made. The main goal or purpose of the CR is the distribution and usage of the radio resources; and for a fair communication an optimal resource distribution is required. For instance, a CR can be tuned to monitor a spectral band of interest, determine open frequencies and interfering signal bandwidths, and signaling types in order to mitigate transmission collisions. A summary of the functional requirements is listed in the requirements matrix in Table I below. The columns of the requirement matrix are labeled Decision, Methodology, and Radio Performance Metric & Measures. Decision, as described in the previous paragraph, uses the observed data as input. Methodology describes the algorithmic approach use to make the "Decision". Finally, "Radio Performance Metric & Measures" are input observed data upon which decisions are made to initiate actions by CR.

TABLE 1

CR Requirement Matrix

| CR Decisions | Methodology | Radio Performance Metric/Measures |
|---|---|---|
| CR shall perform channel sensing | Energy detection, Match Filtering | Receive Signal Strength Indicator (RSSI) |
| CR shall classify available channels | Power Spectrum Density (PSD) | Black Space, Grey Space, White Space |
| CR shall employ dynamic frequency selection (DFS) | Tune to White Space Frequency Channel | Integer Increment of Frequency Step Size |
| CR shall employ adaptive modulation and coding scheme. | Channel Encoding & Symbol Modulation | Channel Capacity based SNR |
| CR shall employ differential power control with other CRs in the network | Increase Transmit Power in incremental step (1 dB etc.) | RSSI-Minimum Receive Sensitivity |
| CR shall employ low probability of intercept (LPI) modes | Direct Sequence Spread Spectrum (DSSS); Frequency Hopping (FH) | High Interference Indication from Repeated Packet Loss |

The terms Black Space, Grey Space, and White Space require further explanation as they are not as known as the other terms. Black spaces refer to frequency channels that are experiencing high-power local interferers. Grey spaces refer to frequency channels that are experiencing low-power local interferers. And white spaces are frequency channels without RF interferers apart from ambient noise. White spaces and grey spaces (with a smaller amount probability) are suitable for exploitation by secondary users. A suitable encoding of the methodology for Radio Performance Metric/Measures is necessary to solve the given optimization problem. The most commonly used encoding techniques are binary encoding, permutation encoding, value encoding and tree encoding. Embodiments of the present disclosure can use binary encoding to facilitate training and output actions for the machine learning. For example, a total frequency allocation ranging from 128 MHz including guard band with frequency step size is 500 KHz can be represented by a 16-bit binary value representation for each 500 KHz increment.

Machine learning, a discipline of artificial intelligence, can be leveraged to smartly control radios in the network to best use the spectrum allocated to them. The term "deep learning" is a reference to the multiple processing layers found in different machine learning architectures. Even though many deep architectures exist, an artificial neural network with greater than two internal layers is known as a deep neural network (DNN). Commercial success using DNNs has come about only over the last 3 years, and their continued development and implementation has grown exponentially within different fields. Google and Microsoft recently improved performance in speech and image classification applications using DNNs, which now perform better than the favored Markov models.

One ubiquitous class of DNNs is the convolutional neural network (CNN). The CNN is a supervised network capable of solving complex association, classification, and modeling problems. The CNN may accept multi-dimensional input data (i.e., imagery or sensor-fused data or, in this proposal, MIMO or MISO primary and second user transmissions) and is able to learn prominent features in the input training data set. As a supervised technique, CNNs require that labeled data be available for training. But when operating in a post-trained unsupervised environment, the CNN is then able to generalize features from new incoming data. Thus, the network can detect events, classify objects, and interpolate features from input sources that it has not seen previously. Fine tuning a trained network to learn additional features is also viable, allowing the network to operate in an online fashion.

The methodology disclosed herein uses state-of-the-art (SoA) DNNs combined with SoA spectral combining and underlay techniques. Specifically, a convolutional neural network (CNN) processes RF data to determine spectrum availability and interfering signal statistics. Approaches of blind energy detection, with respect to spectral sensing, are unable to classify signaling types or detect short-duration (bursty) communication signals, because the integration times are short. A deep learning network disclosed herein is able to resolve both of these problems by moving the problem into a higher-dimensional nonlinear space. This technique makes up the first stage of a robust spectral sensing system.

The disclosed architecture is twofold: Spectral sensing via deep signal detection (DSD), using channelizing techniques coupled with convolutional neural networks. This topology offers the ability to determine which frequency bands have active communication signals, including bursty transmissions and very-weak signals with negative SNRs, along with determining signal bandwidths, classes of signals present in the band, and other statistics necessary for optimizing spectrum allocation.

Automated channel access recognition (ACAR) using deep learning manages and optimizes the radio frequency (RF) spectrum allocation by selecting the channel access mechanism and associated tuning parameters to adapt to the changing RF environment, which can consist of other collaborative radio networks, non-collaborative radio networks (which are incapable of adapting) and other potential interference sources. Successful network design will consider traffic priority, latency and data rate requirements as part of the machine learning techniques to product spectrum policies for the radio that determine when, where and how to utilize its resources to optimize the total spectrum usage.

Figure 2:
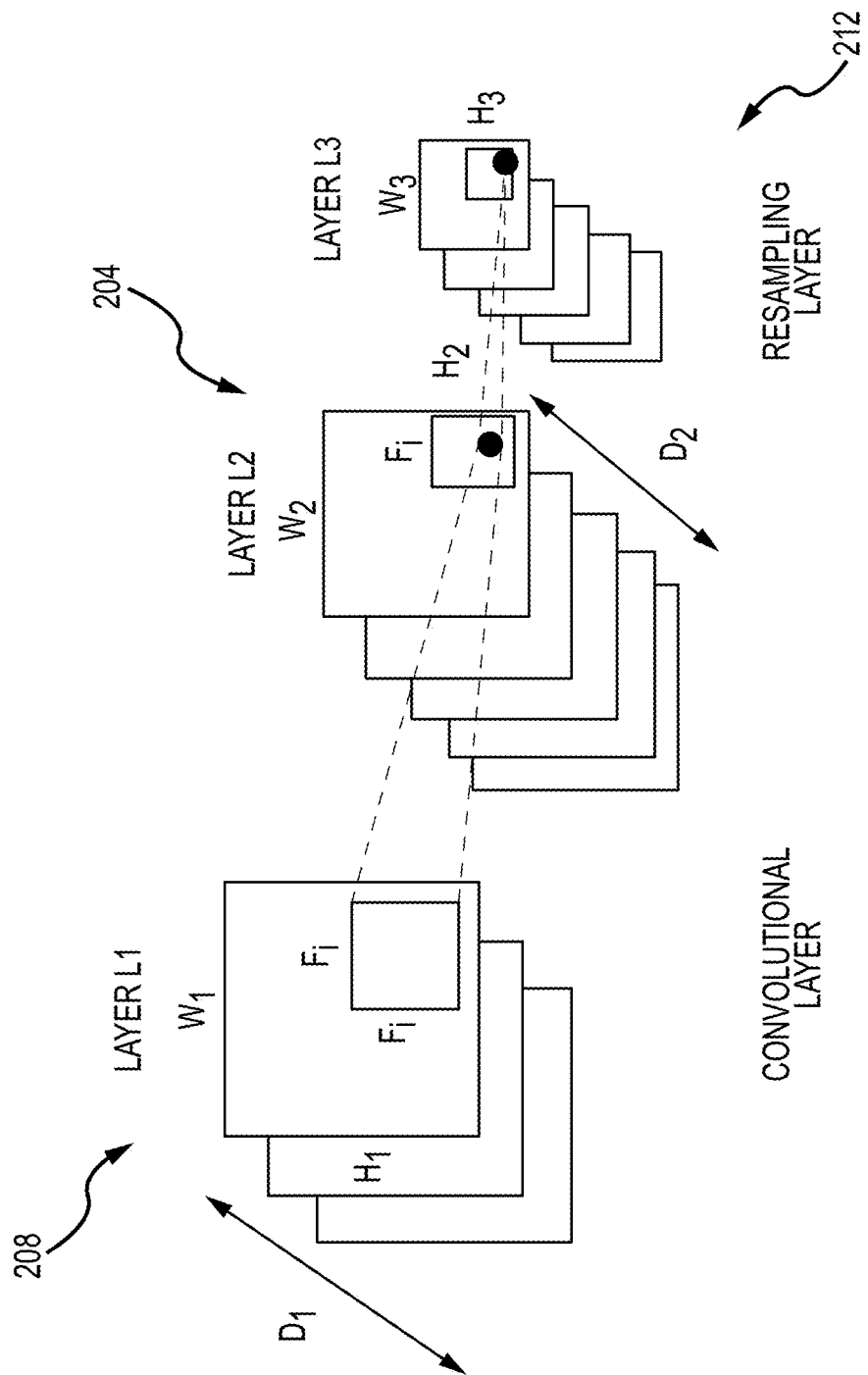
FIG. 2 illustrates example layers of a deep neural network (DNN), implemented as a convolutional neural network (CNN)

The disclosed architecture is described in greater detail in the following description. For example, in FIG. 2, a DNN in accordance with embodiments of the present disclosure, implemented as CNN 204, is depicted. The convolutional structure of a CNN refers to the weight-sharing principle in its convolutional layers. The output feature maps are generated by using a window of 2D data from the previous layer. Each feature point in a map is a weighted sum of the input data passed through a nonlinear activation function. The window is then moved by a given stride to produce the next feature map point, using the same weights to scale the input. This operation equates to a two-dimensional convolution operation, giving the structure its name. FIG. 2 illustrates an example structure including layers 208 of a convolutional neural network (CNN) 204.

In accordance with embodiments of the present disclosure, there are four parameters that define a convolutional layer 208 (for each map).

The filter (kernel) size F, also called the receptive field. It is related to the field of view that the kernel spans.

The number of filters, K, which determines how many feature maps exist.

The stride S, which is the step that the kernel moves for each output computation The amount of padding P applied to the input to generate a properly-sized output map (integer number of output points).

The input to output map dimensions are related via the following equations. Given an input array with width W, height H, and depth (number of feature maps) D, the next layer L is sized according to:

$$W_t = \frac{W_{i-t} - F_i + 2D_i}{S_t} + 1$$

$$H_t = \frac{H_{i-t} - F_i + 2D_i}{S_t} + 1$$

$$D_t + K_t$$

Note if S=1 and P=(F−1)/2 the output map will be the same size as the input map. This is the preferred method for stacking multiple convolutional layers.

The number of maps in a given layer determines the variability of features extracted by the neural network. Each output point in a given map is computed via a 2D convolution. That is, with input array x[n,m] having N rows and M columns and letting the stride S=1.

$$y[n, m] = \sum_{t=0}^{N-1} \sum_{j=0}^{N-1} w[t, j] \times x[n - t, m - j]$$

When the stride S>1, the convolution is decimated, resulting in a smaller output map size. Note that the weights w[n,m], which are different for each feature map, are equivalent to filter kernels used in image processing. Because the weights are learned by the network, the CNN computes kernels that represent features common to all the input training data. Since the weights can be viewed as convolving with the input data, features are able to be discovered independent of their location within the input. For example, it does not matter if a feature is located in the center, bottom, or top right of a 2D image. This mitigates having to preprocess the data to locate (or center) the data before being ingested by the system.

The resampling operation 212, defined as pooling, reduces the feature map dimensions from the previous layer. As such, the deeper layers of the CNN span a larger window of the first layer. The result is 1) the deeper layers are able to extract higher-level features from the input, and 2) the resampling gives the network some scale invariance to the input data. So, the shallow layers tend to learn gross features, such as edges, orientation, and the like. The deeper layers learn salient features of the entire input—like structures, shapes, etc.

For classification problems, the CNN 204 is followed by output layer(s) consisting of multi-layer perceptron(s) (MLP). MLPs are also referred to as fully-connected layers since each neuron is connected to every other neuron. MLPs are universal function approximators; these layers handle the classification task where the convolutional layers handle the feature set generation. Because MLPs are fully connected, most of the free parameters (weights) are located in these last layers.

In at least one implementation, optimal spectrum allocation begins with reliable signal detection over a myriad of RF impairments and environments. Classical signal detection theory generally assumes signals are embedded in additive white Gaussian noise (AWGN). This type of noise is common in the real world; it also makes the mathematical analysis tractable due to the properties of the noise process.

Embodiments of the present disclosure compute time-frequency spectrograms (a non-parametric technique) on the incoming RF time-series data to form a temporal view of a spectrum chunk. Using this 2D time-frequency data, the disclosed system analyzes the energy (magnitude) and phase of a signal over some time window in a pre-determined frequency band. By collecting spectrograms over time, the disclosed system creates a system to monitor a band of interest for spectral occupation. As a result, robust signal detection, even for negative SNR cases, enables the system to compute a metric on the available spectrum and statistics of in-band signals. This effectively maximizes spectral sensing capabilities. Due to the near-far problem, low-level signals need to be detected just as reliably as strong signals, since in a tactical environment every communication is weighted equally. This is akin to air traffic communications using historical linear modulation techniques, since every signal needs to be received by air control no matter the power level.

The disclosed architecture assumes a cluttered frequency band with the following impairments: 1) AWGN noise, 2) other offending signals, 3) varying SNR and bandwidths of signals in the band. The CNN's job is to learn if a signal, or signals, is located in the frequency band. Using the CNN outputs, downstream decisions can be made regarding allocation of bandwidth for other signals that wish to share the spectrum.

Figure 3:
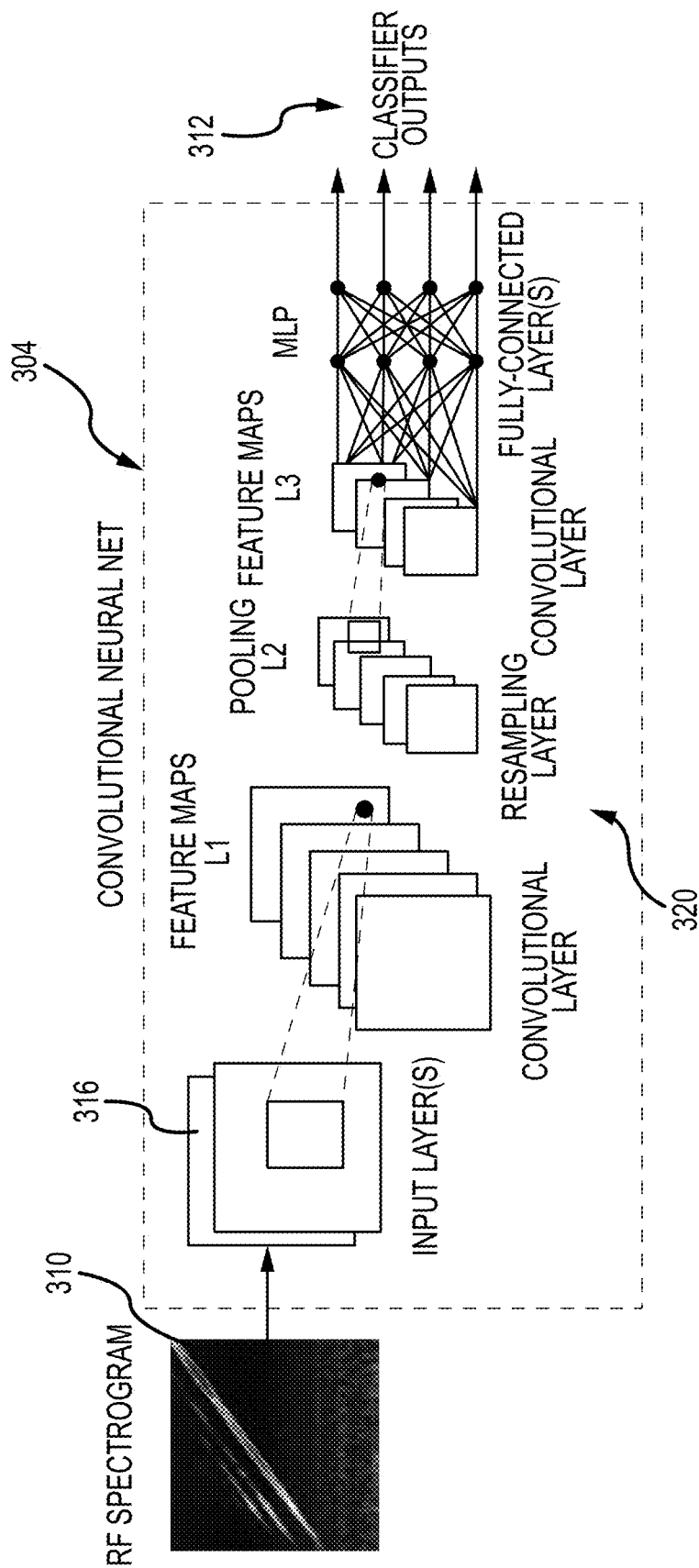
FIG. 3 illustrates an example architecture of a CNN-based signal detection system.

FIG. 3 illustrates an example architecture of a CNN-based signal detection system. Specifically, FIG. 3 shows a CNN 304 that ingests an RF spectrogram 310 and classifies the input time-frequency gram. The output classes 312 could be as simple as "signal present", or "signal not present", or more complex classes such as signal types "FSK present", "PSK present", "carrier present", or "noise only". Another CNN that returns the estimated bandwidth of in-band interferers could also be utilized. In these scenarios, the CNN 304 returns probabilities for each class for a given spectrogram 310. This can be leveraged in downstream processing for further statistical modeling.

Overlapping spectrograms can be calculated so no time gaps between spectral captures is observed. In fact, if one is to keep the square input structure of the CNN input (as is done in image classification), no further modifications to the CNN network is needed. As a result, the disclosed system just needs to determine the record length of the data for the spectrogram computation. In general, the spectrogram overlap factor may be set to meet the temporal resolution needed by the system. Thus, the overlap factor is constant, and the record length (number of samples) may be determined to ensure a square spectrogram.

The frequency resolution will still equal $\Delta f = f_s / N_{fft}$.

Constraining the overlap factor to be a rational fraction of the transform size, i.e., $N_{overlap} = n/d * (N_{fft})$, the record length is computed via $$N_{recordlen} = \beta \cdot N_{fft}^2 \left(1 - \frac{n}{d}\right) + \frac{n}{d} N_{fft}$$

where ß=1 for complex-valued input data, or ß=½ for real-valued input. In one implementation, the spectrogram consists of magnitude values (in dB or natural units) for energy detection. An implementation extends this to use native complex-valued data of the spectrogram. The system imposes the real and imaginary parts into two input layers of the CNN. With the added information to the input layer, the CNN is capable of learning magnitude and phase relationships in the RF data using just the I/Q samples. That is, the network will learn (on its own) magnitude and phase associations in the complex-valued data, which then can improve the ability of the network to discern different signaling and communication transmissions.

Expanding on the architecture of FIG. 3, an implementation processes very wide bandwidths to determine which spectral chunks have active signals and which are open. In this example implementation. The disclosed system utilize signal processing channelization of RF data into smaller sub bands or input layers 316. Each of these sub bands is then input to the layers 320 of the CNN 304, or a multitude of CNNs, to automate the process of dynamic signal detection. This is a stepping stone to full-bandwidth smart frequency allocation.

The disclosed system lends itself to real-time operation with the use of efficient polyphase channelizer algorithms (transmultiplexer) or fast-convolution based channelizers. Here, the entire front-end bandwidth is analyzed in one feedforward pass. The smaller sub bands are decimated and ingested by the CNN 304. Processing sub bands also gives better frequency and time resolution for a set transform size. This method is more computationally efficient than processing a single wide-bandwidth spectrogram. And finer spectral details can be observed in the sub bands since the decimated sampling frequency allows for greater frequency resolution using smaller transform sizes.

Figure 4:
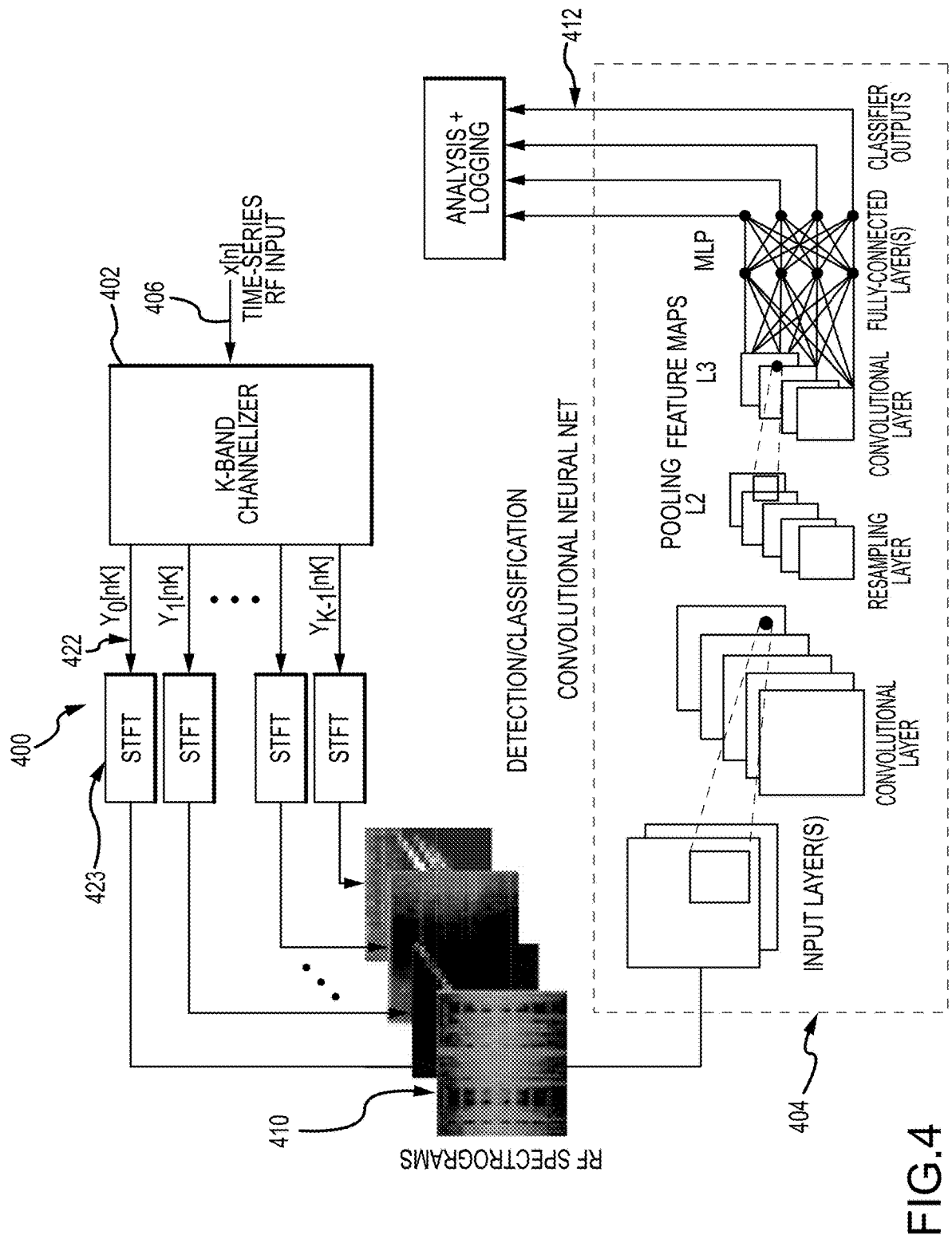
FIG. 4 illustrates an example diagram of a system for wideband spectral sensing according to the technology disclosed herein.

FIG. 4 illustrates an example diagram of a system 400 for wideband spectral sensing according to the technology disclosed herein. Specifically, FIG. 4 discloses a channelizer 402 coupled with CNNs 404 for wideband spectral sensing. The implementation of the system in FIG. 4 acts as an adjudicator for smart spectral allocation. Here, the system 400 is constantly monitoring the bands of interest, and is capable of finding and classifying signals within the band of the operating radio. This allows the radio to transmit without stomping on another radio's transmission. The disclosed system can also classify the occupied bandwidth and type of signal. Furthermore, for spurious or burst transmissions, the system is capable of detecting these transmissions at low power levels, which is not viable using other linear processing algorithms. As shown, timeseries RF inputs 414 are transformed into 2-D RF spectrograms 410, that are fed into one or more CNNs 404.

For example, in at least one implementation, a CNN is trained to have two output classes, "pos=signal present" and "neg=signal not present". In this setup, the CNN is trained with a chirp signal as the signal of interest (positive case). Since chirps are short duration and frequency agile, their detection is difficult at low SNR. Everything else is consider noise (negative case). The signal can reside in a spectrogram at any frequency, SNR, chirp rate, and duration. In one implementation, Nvidia's "DIGITS" tool is used to train and test the custom CNN network.

Figure 5:
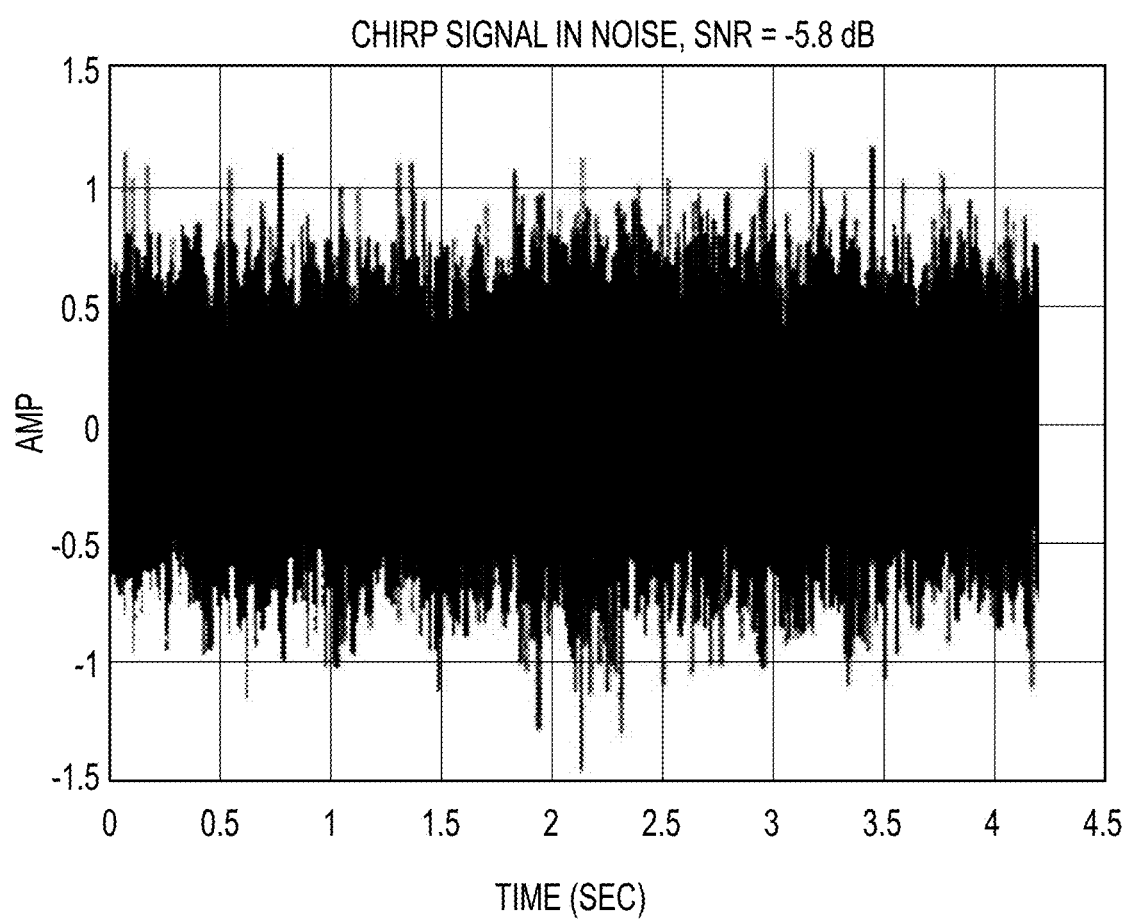
FIG. 5 illustrates an example time-series data for an implementation of the technology disclosed herein.

FIG. 5 illustrates an example of time-series data for an implementation of the technology disclosed herein. Specifically, FIG. 5 shows the captured time-series data. The noise is predominant, and the short duration of the signal makes detection difficult.

Figure 6:
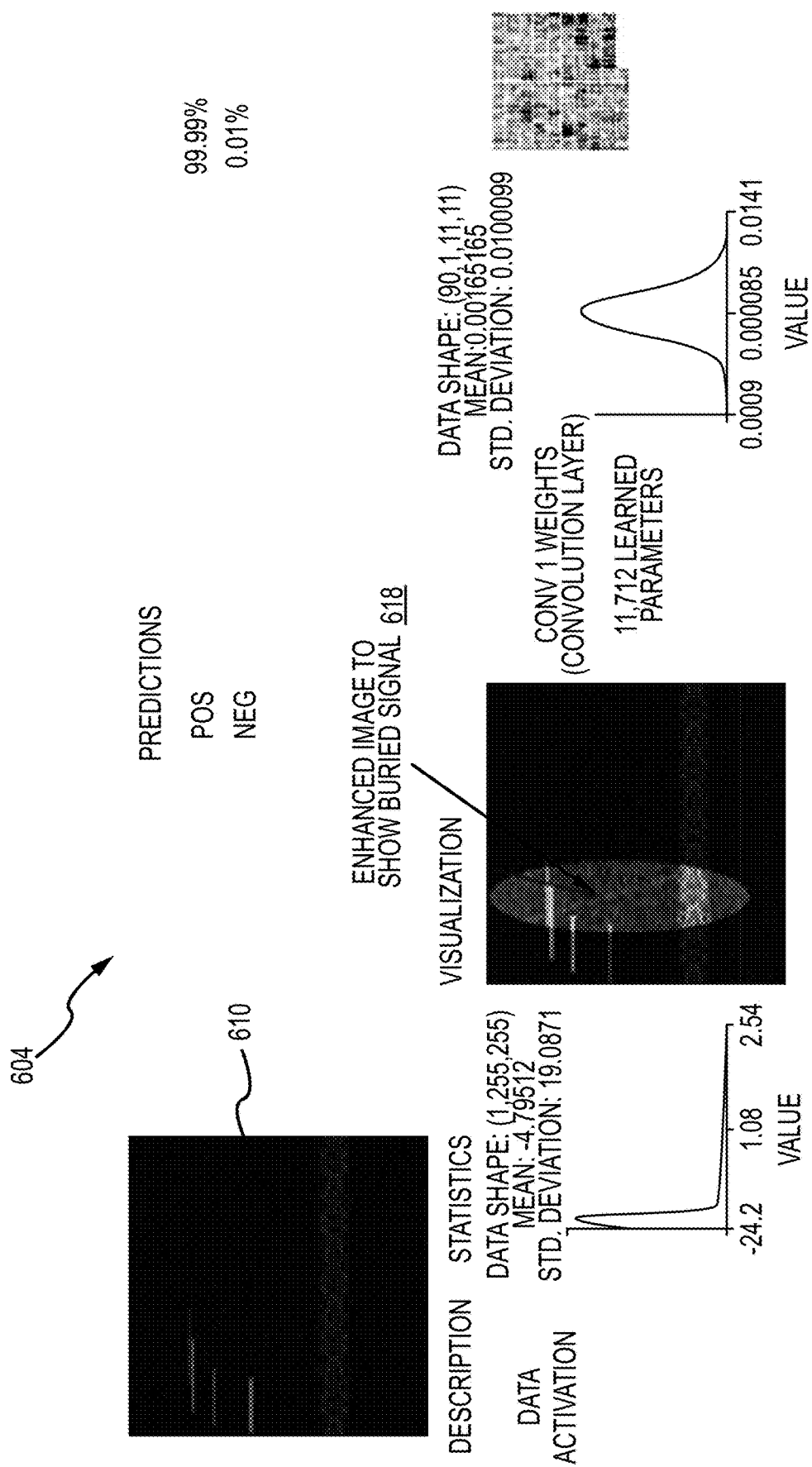
FIG. 6 illustrates an example block diagram of a trained CNN detecting a signal buried in noise.

FIG. 6 illustrates an example block diagram of a trained CNN 604 detecting a signal buried in noise. Specifically, FIG. 6 shows the spectrogram of the captured data 610, which consists of AWGN, several narrowband pulsed carriers, and a PSK communication signal. A chirp signal is embedded in this dataset with an SNR~=−6 dB. Linear methods are unable to detect the signal at this low level, particularly when the signal shares the same bandwidth with interfering signals. The power of the CNN 604 is demonstrated in FIG. 6, where the network successfully detects the signal 618 buried in noise with high probability. The size of the network also governs the classification ability as well as the computational load. For any convolutional layer in a CNN, the number of free parameters is given by:

$$L_t(\text{freeparams}) = (F_t^2 \cdot D_{t-1} + 1) \cdot K_t$$

And the number of neurons in a layer is $$L_t(\text{neurons}) = (W_t \cdot H_t) \cdot K_t$$

State-of the-art CNN networks can have hundreds of layers. With large numbers of feature maps, free parameters (weights and biases) of a network can easily run in the tens of millions. For successful deep network training, it is important to have a properly sized network and a large, representative training set in order to impress enough relevant information into the network.

Similar to spectral sensing, ACAR can benefit from advances in deep learning and AI. Leveraging FIG. 4, the system 400 takes in a large channel of RF data 406 (i.e. 100 MHz) and the channelizer 402 splits the data into smaller sub-channels 422 (i.e. 1 MHz) for efficient spectral sensing. Short-time Fourier transforms 423 can be used to create the spectrograms 410. The DSD CNN 404 used for detection/classification can be augmented to include channel quality metrics. Or a separate CNN 404 can be designed and trained on the same RF input data, but now the output 412 from the network 404 is a probability of the channel noise process and even the usable bandwidth in the channel. By using a softmax classifier, the system 400 trains the network 404 to classify the noise process in each sub channel and return a soft metric in the form of a probability. The classes can be chosen based on the RF working environment (i.e. AWGN, white, Rayleigh, gray, etc.).

Furthermore, a computational enhancement falls out from utilizing the CNN. Instead of computing the channel quality (CQ) metric over the entire bandwidth of the sub-channel (i.e. 1 MHz), returning a single metric, the system extends the idea by transforming the same network into a fully-convolutional neural network (FCNN). The fully convolutional network provides channel quality metrics over sections of the entire input spectrogram, effectively localizing the CQ metric in time and frequency. The output of the network is a heat map that returns probabilities over each windowed section of the spectrogram.

Figure 7:
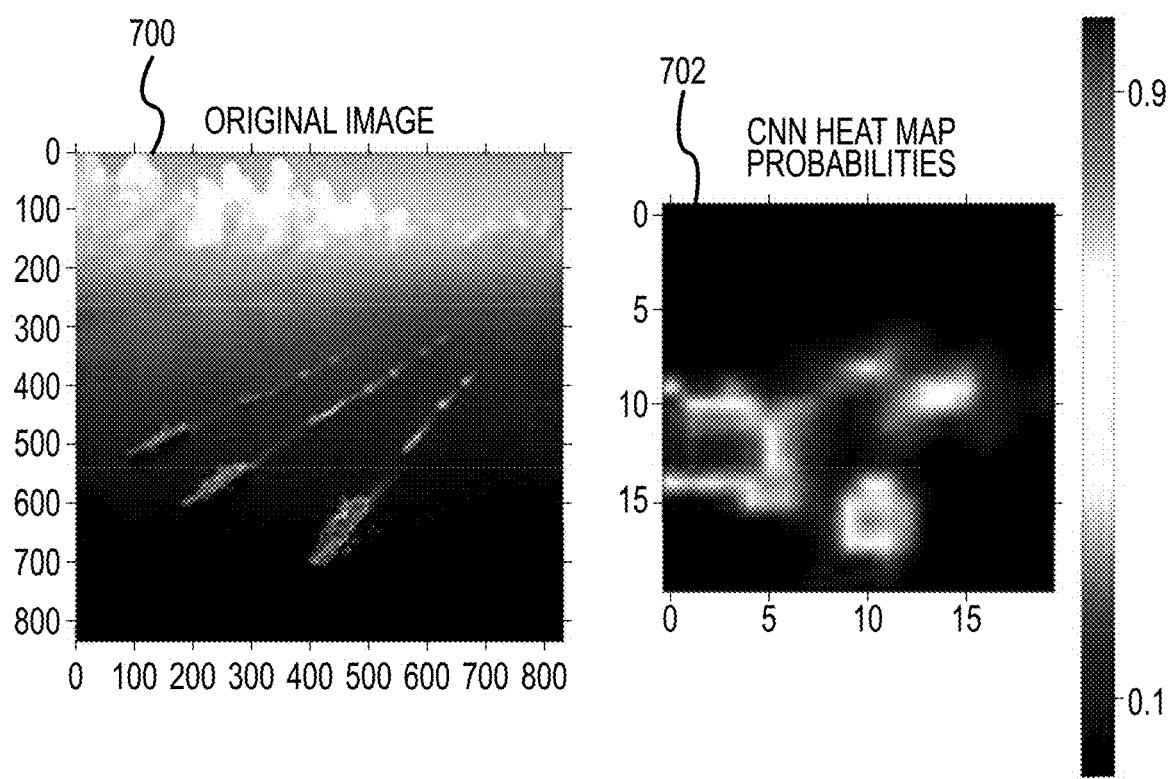
FIG. 7 illustrates an example fully-convolutional neural network heat map probability output of class "aircraft carrier"

FIG. 7 illustrates an example fully-convolutional neural network heat map probability output 702 of class "aircraft carrier". Specifically, FIG. 7 shows an example of an image-based FCNN classifier heat map output for a single selected class. The heat map in FIG. 7 may result from analyzing RF spectrograms, depicted in FIG. 4 as an image 700 containing an aircraft carrier, and may contain channel quality probabilities for each pre-defined channel quality class.

Using this topology, each sub channel (after the channelizer in FIG. 4) is classified into smaller frequency and time cuts than the original data set. Instead of having to further channelize the sub-channels, mix each to baseband, filter and measure, the system disclosed herein allows the FCNN to compute localized ACAR metrics automatically, which can then be fed into downstream processing for traffic priority, tuning parameters, etc.

An optional third CNN 404 is trained to detect occupied signal bandwidth, and it may be trained on the same RF labeled data. Here, the output of the network is a bitmask that is TRUE for occupied spectrum and FALSE for unoccupied spectrum. The bitmask can be combined, linearly or nonlinearly using further AI routines, with the channel quality metrics and spectral sensing outputs to make a downstream decision for optimal SDR parameters. The CNNs can take on different network structures to combine or share the computational load, depending on the targeted hardware. The ACAR CNN can also be gated by the spectral sensing engine to reduce computations when there is no interference detected in a given sub channel.

Figure 8:
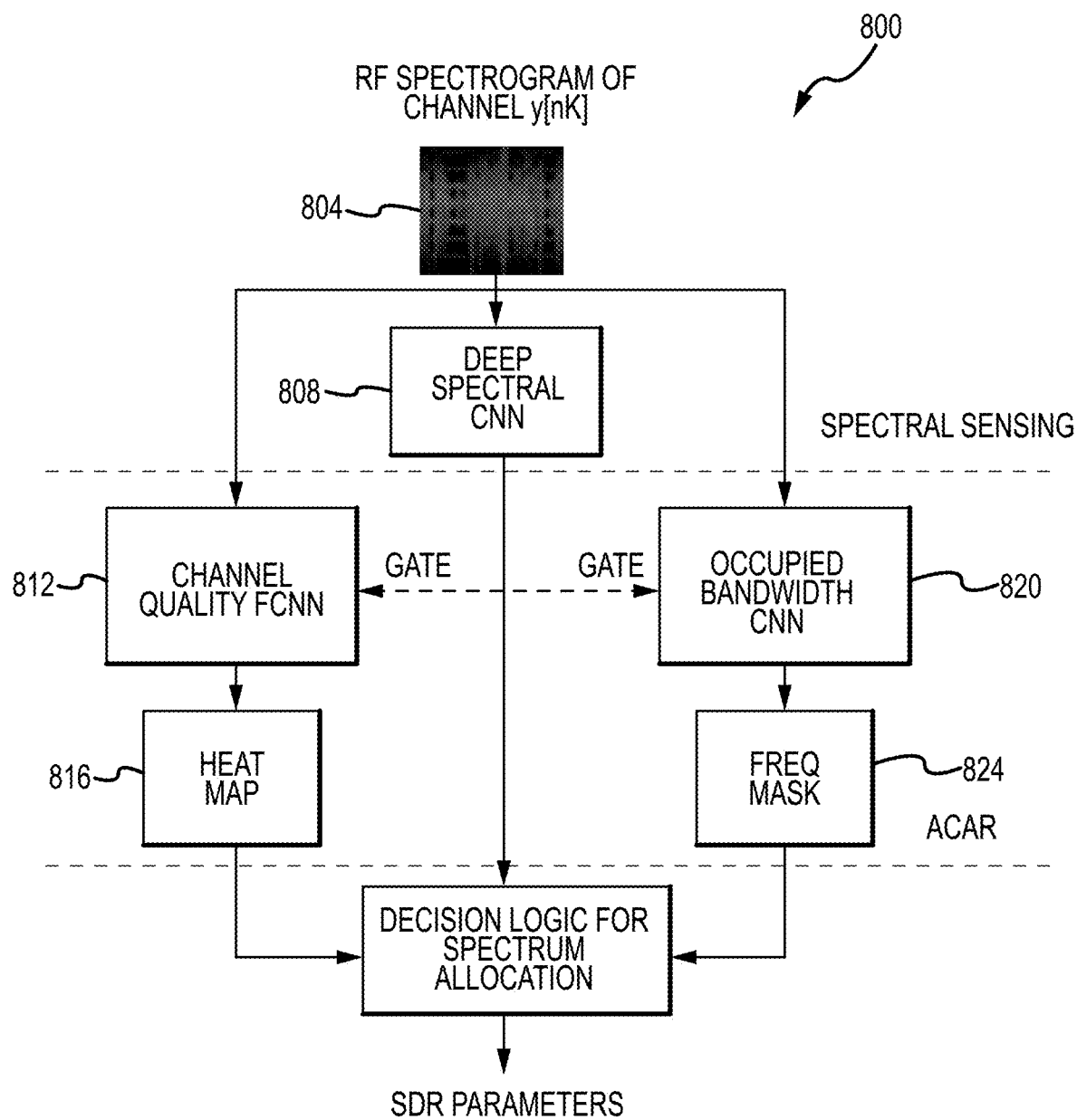
FIG. 8 illustrates an example system diagram of the technology disclosed herein for automated channel access recognition (ACAR)

FIG. 8 illustrates an example system diagram of the technology disclosed herein for automated channel access recognition (ACAR). Specifically, FIG. 8 demonstrates an implementation of a system architecture 800 in which spectral sensing is combined with ACAR using AI and deep learning. Other deep learning methods employing deep neural networks, including convolutional neural networks (CNNs), auto-encoders, and recurrent convolutional neural networks (RNNs), can also be leveraged to assist in solving these problems.

Figure 9:
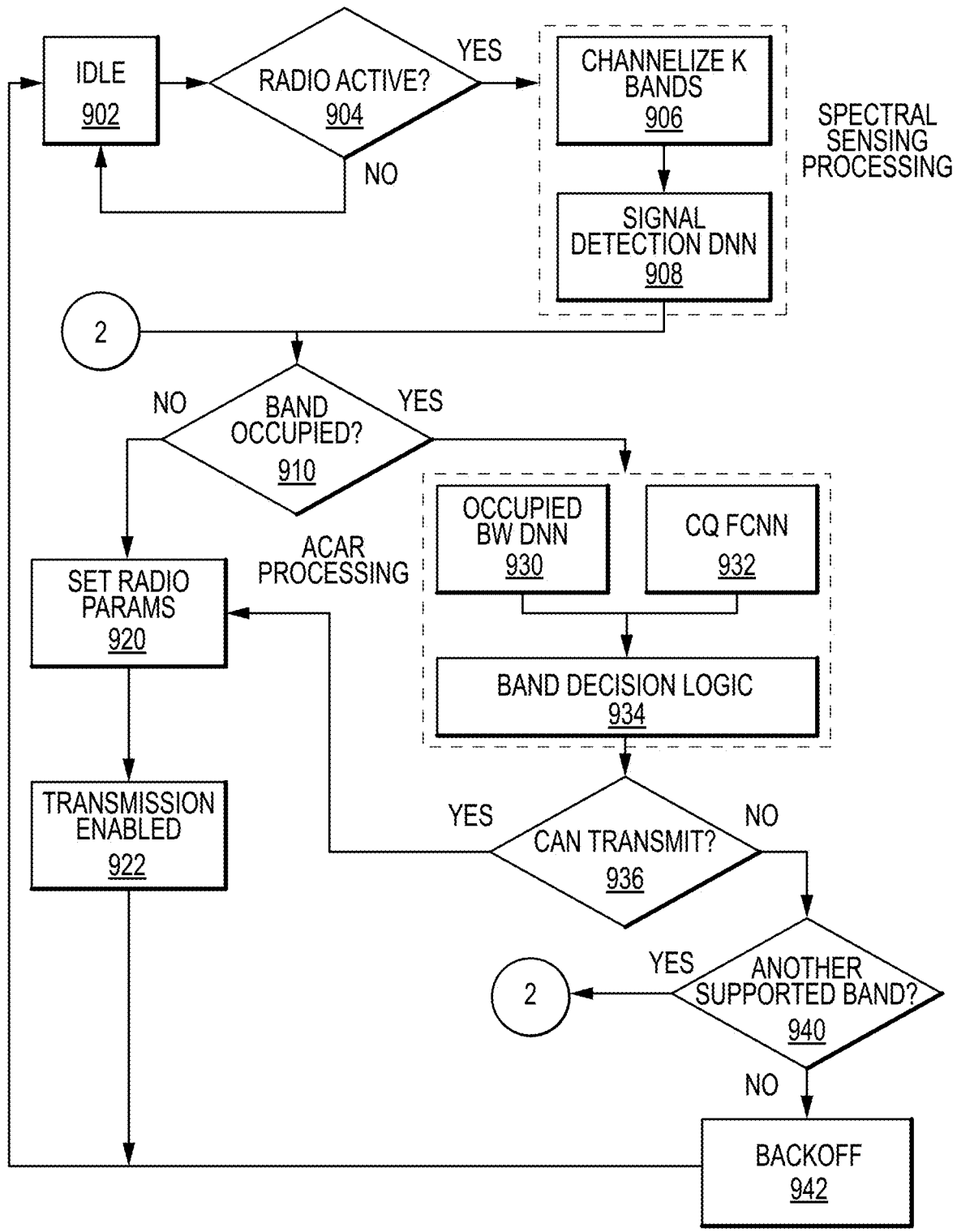
FIG. 9 illustrates example operations of the technology disclosed herein.

FIG. 9 illustrates example operations of the technology disclosed herein. Specifically, in FIG. 9, a block diagram depicting the cognitive radio spectrum allocation method is shown. In this embodiment, transmission restrictions are put in place on each radio (the feedforward link). Each radio can receive signals while in the Idle mode of 902. This preserves battery life since the radio does not need to compute allocation statistics if it does not need to transmit, via the decision in 904. Before a transmission begins, the unit begins the spectral sensing processing block. Based on the radio specifications, operation 906 channelizes the incoming spectrum into smaller channels. The frequency bands that are supported by the radio are analyzed in 908 by sending each channel into a first DNN or CNN, the spectral sensing DNN. The raw time-series data for each channel is transformed into the frequency domain using the short-time Fourier transform, or other domain transform, to view the time-frequency content of the signal. These 2D grams are inputs to the DNN. The output of the DNN is a probability of a signal being present or absent in the current channel. If the radio band is not occupied per the decision in 910, then the radio can proceed to 920 to set the transmitter parameters to the correct center frequency and bandwidth. Operation 922 denotes the radio transmitting on the desired frequency band. Afterwards, the radio re-enters the idle mode of 902.

If, at 910, the channel of interest is occupied from the result of 908, then a secondary processing chain is followed to determine the amount of traffic in the band. The ACAR processing block handles the brunt of the computations. It is comprised of 930, a second DNN or CNN that computes a 2D spectral mask showing where signals lie in the channel over frequency and time. Also, a third DNN or CNN 932 computes a channel quality metric (from SNR or other spectral components) using a DNN or even a FCNN for efficient processing—also over frequency and time. The output of the third DNN 932 is a heat map showing locations of low and high channel quality markers in the channel. Operation 934 accepts both 930 and 932 as inputs, where it combines the mask and map into a probable "go-no go" decision for the radio to utilize this band for transmission. The output of 934 can be frequency and bandwidth pairs that it has determined are available for transmission. Per 936, if the band is favorable for radio transmission, then the frequency and bandwidth restrictions from 934 are sent to the radio transmit block in 920, where radio parameters are set accordingly. Transmission commences in 922.

If in 936, the decision is made that the frequency band is not hospitable for transmission at this time, the radio service may see if it supports other channels for transmission. Operation 940 may determine whether another band is supported, resulting in the diagram process returning to 910 for further analysis. If there are no other bands that are supported by the radio transmitter per 940, the radio may enter a backoff mode in 942. Here a random time backoff is observed, and the radio may return to 902. The radio then can re-analyze the frequency bands for a gap that appears when spectrum opens up due to other radios shutting off their transmitters.

Figure 10:
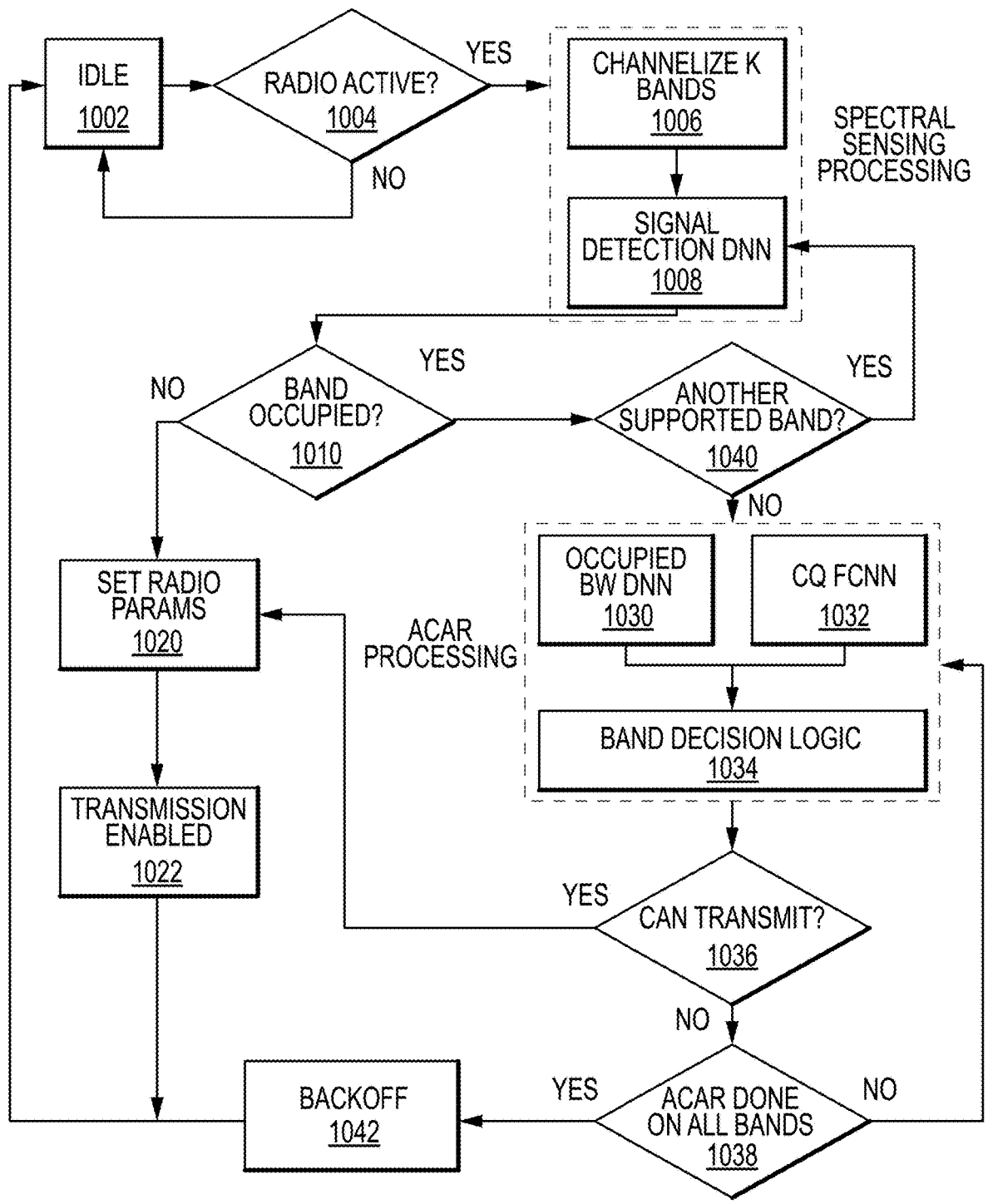
FIG. 10 illustrates additional example operation of the technology disclosed herein.

In one implementation, the operations of FIG. 9 are also optimized for radios that support many bands. Specifically, FIG. 10 shows this optimization, where operation 1006 may channelize all the bands simultaneously. But in operation 1008, each supported band may be processed serially through the spectral sensing network. If it is determined that all the supported bands are occupied, operation 1040 may then enable ACAR processing on each of these busy frequency bands. If after all supported bands failed ACAR spectral allocation, then operation 1038 may result in a time backoff and retry.

In this implementation, the probability that at least one band is clear is, in general, high for a multi-band radio. The expected traffic profile of each supported band could also be used in advance to predetermine the search order of the channels, akin to Huffman coding, to further reduce the average computational load. Bands with higher past probabilities of being unoccupied may be searched first. These assumptions may allow for efficient processing since only the spectral sensing block has to be performed on average. If all bands are presently occupied, only then does the radio have to perform the ACAR processing to further determine viable spectrum allocation. This further mitigates high computational burden on the radio's hardware resources and battery life.

Figure 11:
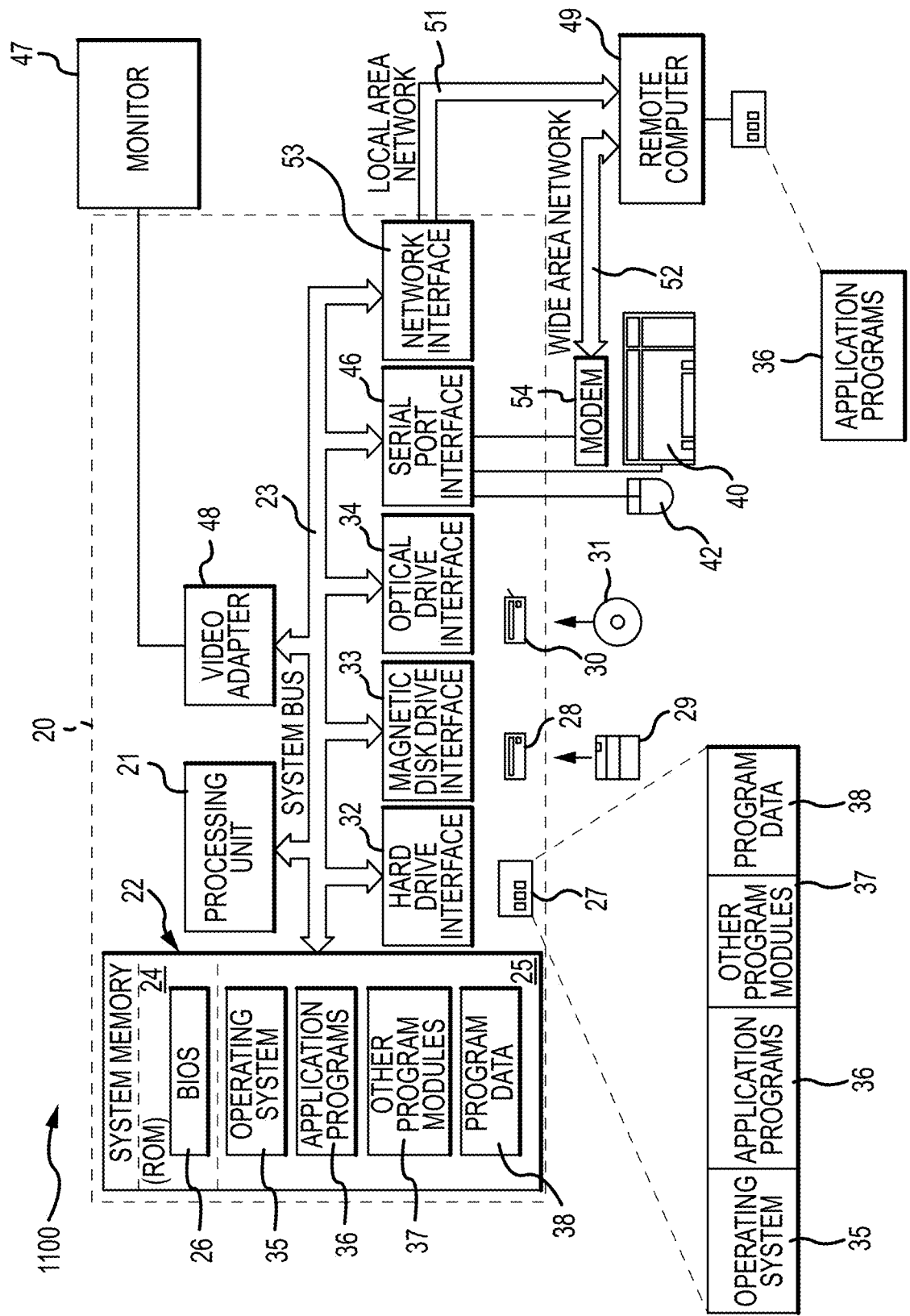
FIG. 11 illustrates an example system that may be useful in implementing the described technology.

FIG. 11 illustrates an example system 1100 that may be useful in implementing the described technology for providing spectral sensing and allocation. The example hardware and operating environment of FIG. 11 for implementing the described technology includes a computing device, such as a general-purpose computing device in the form of a computer 20, a mobile telephone, a personal data assistant (PDA), a tablet, smart watch, or other type of computing device. Moreover, example embodiments of the system 200 include a configurable RF device, such as a cognitive radio, software defined radio, satellite communications device, MIMO device, a 5G device, or the like. In the implementation of FIG. 11, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a track pad, a satellite dish, a scanner, or the like. These and other input devices are often connected to the processing unit 21 through a serial port interface 46 that is coupled to the system bus, but may be connected by other interfaces, such as a parallel port, or a universal serial bus (USB). A monitor 47 or other type of display device is also connected to the system bus 23 via an interface, such as a video adapter 48. In addition to the monitor, computers may include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and may include many or all of the elements described above relative to the computer 20. The logical connections depicted in FIG. 11 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 may include a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other communication devices for establishing a communications link between the computers may be used.

In an example implementation, software or firmware instructions for providing spectral sensing and allocation may be stored in memory 22 and/or storage devices 29 or 31 and processed by the processing unit 21. Rules for providing spectral sensing and allocation may be stored in memory 22 and/or storage devices 29 or 31 as persistent datastores. For example, a spectrum sensing and allocation module may be implemented with instructions stored in the memory 22 and/or storage devices 29 or 31 and processed by the processing unit 21. Similarly, a GPS parameter processing module may also be implemented with instructions stored in the memory 22 and/or storage devices 29 or 31 and processed by the processing unit 21. The memory 22 may be used to store other algorithms.

Figure 12:
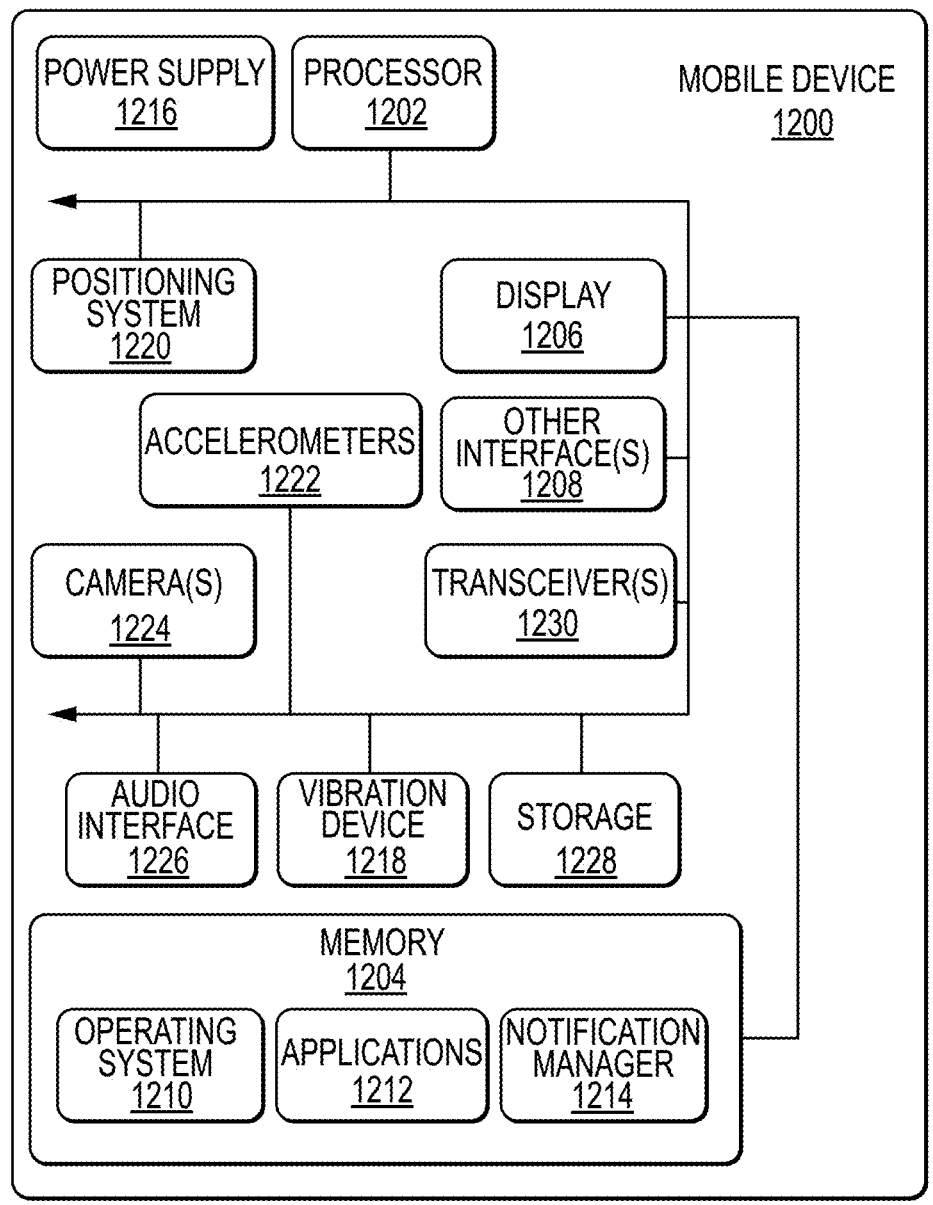
FIG. 12 illustrates an example mobile device that may be useful in implementing the described technology.

FIG. 12 illustrates another example system (labeled as a mobile device 1200) that may be useful in implementing or using the described technology. Examples of a mobile device 1200 include a mobile telephone. Moreover, the mobile device 1200 may comprise a cognitive radio, satellite communications device, MIMO device, 5G device, or other configurable RF device. The mobile device 1200 includes a processor 1202, a memory 1204, a display 1206 (e.g., a touchscreen display), and other interfaces 1208 (e.g., a keyboard). The memory 1204 generally includes both volatile memory (e.g., RAM) and non-volatile memory (e.g., flash memory). An operating system 1210, such as the Microsoft Windows® Phone operating system, resides in the memory 1204 and is executed by the processor 1202, although it should be understood that other operating systems may be employed.

One or more application programs 1212 are loaded in the memory 1204 and executed on the operating system 1210 by the processor 702. Examples of applications 1212 include without limitation email programs, scheduling programs, personal information managers, Internet browsing programs, multimedia player applications, etc. A notification manager 1214 is also loaded in the memory 1204 and is executed by the processor 1202 to present notifications to the user. For example, when a promotion is triggered and presented to the shopper, the notification manager 1214 can cause the mobile device 1200 to beep or vibrate (via the vibration device 1218) and display the promotion on the display 1206.

The mobile device 1200 includes a power supply 1216, which is powered by one or more batteries or other power sources and which provides power to other components of the mobile device 1200. The power supply 1216 may also be connected to an external power source that overrides or recharges the built-in batteries or other power sources.

The mobile device 1200 includes one or more communication transceivers 1230 to provide network connectivity (e.g., mobile phone network, Wi-Fi®, Bluetooth®, etc.). The mobile device 1200 also includes various other components, such as a positioning system 1220 (e.g., a global positioning satellite transceiver), one or more accelerometers 1222, one or more cameras 1224, an audio interface 1226 (e.g., a microphone, an audio amplifier and speaker and/or audio jack), and additional storage 1228. Other configurations may also be employed.

In an example implementation, a mobile operating system, various applications, and other modules and services may be embodied by instructions stored in memory 1204 and/or storage devices 1228 and processed by the processing unit 1202. User preferences, service options, and other data may be stored in memory 1204 and/or storage devices 1228 as persistent datastores. In an example implementation, software or firmware instructions for providing spectral sensing and allocation may be stored in memory 1204 and/or storage devices 1228 and processed by the processor 1202. Rules for providing spectral sensing and allocation may be stored in memory 1204 and/or storage devices 1228 as persistent datastores. For example, a spectrum sensing and allocation module may be implemented with instructions stored in the memory 1204 and/or storage devices 1228 and processed by the processor 1202.

Figure 13:
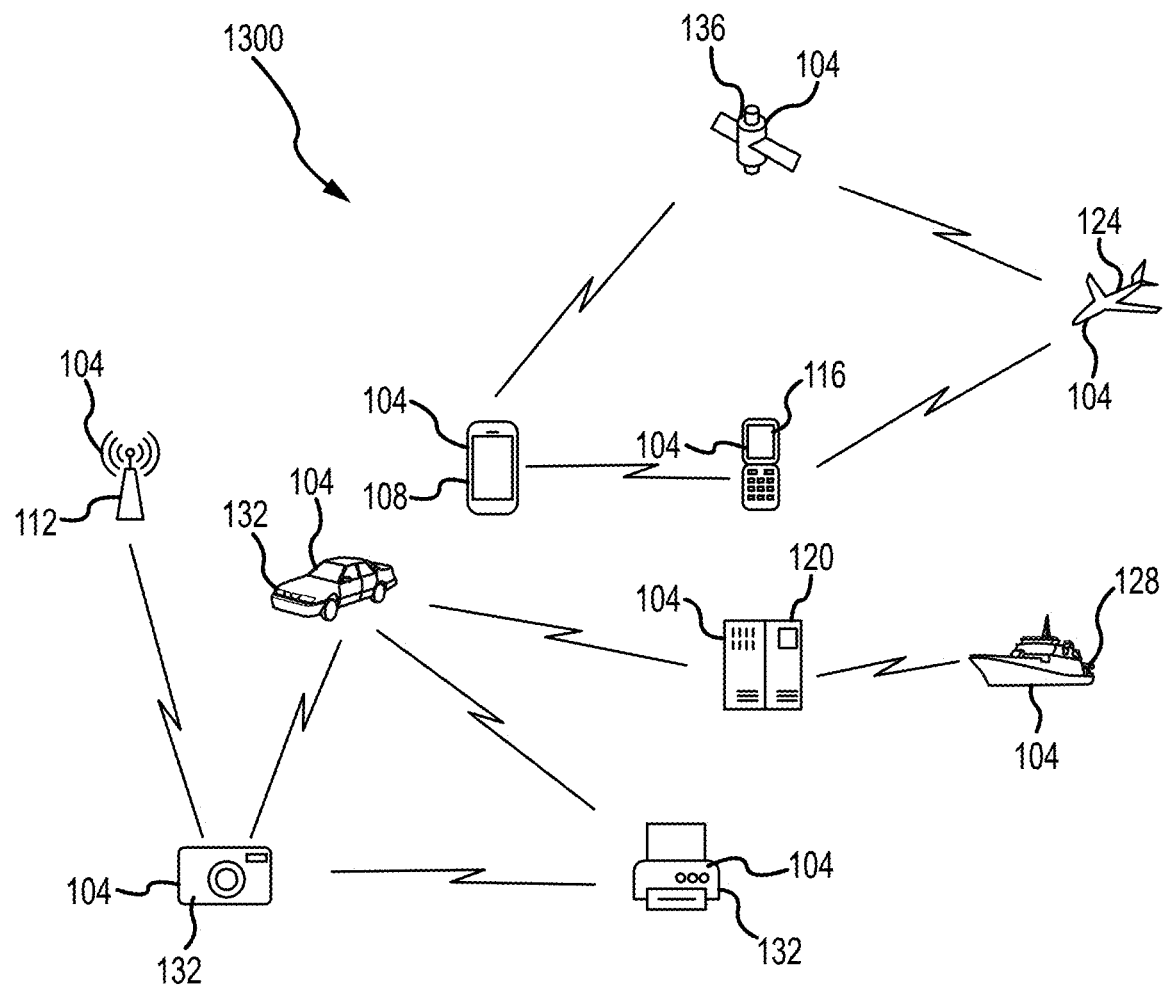
FIG. 13 is a depiction of a communications system environment in which systems and methods in accordance with embodiments of the present disclosure can be operated.

FIG. 13 illustrates an example area or environment 1300 in which plurality of RF devices 104 are operating. The RF devices 104 can include mobile telephones 108, cellular base stations 112, mobile radios 116, fixed location or control center wireless communication systems 120, aviation radios 124, ship to shore radios 128, Internet of things (IOT) devices 132, satellite communications systems 136, or any other wireless communication device. The devices 104 may be operating at the same or different frequencies, bands, or areas of the RF spectrum. Moreover, the RF devices 104 can use the same or different modulation techniques. In addition, the RF devices 104 may be part of the same or different communication systems or networks. For example, some of the RF devices 104 may be operated in connection with a satellite communication network, 5G communication network, or other communication system, while others are operated in connection with a Long Term Evolution (LTE) network, others are operated in connection with public safety networks, and still others are operated according to myriad other standards.

In accordance with embodiments of the present disclosure, at least some of the RF devices 104 can comprise configurable RF devices, such as software defined radios, cognitive radios, satellite communication devices, multiple input and multiple output (MIMO), 5G devices, or the like. As can be appreciated by one of skill in the art, configurable RF devices 104 have the ability to operate across different frequency bands at different times. Moreover, at least some configurable RF devices 104 can comprise cognitive radios, which are able to communicate with other RF devices 104 to avoid detected interference. In accordance with embodiments of the present disclosure, at least one of the RF devices 104 is configured to perform the spectrum analysis functions described herein, in order to assist in selecting unused frequencies or areas of the spectrum.

For example, a configurable RF device 104, such as a cognitive radio 1100, 5G mobile telephone and 1200, or the like can implement a system for identifying usable portions of the RF spectrum as disclosed herein. Moreover, the system can implement multiple DNNs, which in at least some embodiments can be configured as CNNs. In this example, the configurable RF device 104 initially performs spectral sensing processing. As described elsewhere herein, during such processing a spectrogram of the RF spectrum is created. The spectrogram (e.g. as depicted at 804 in FIG. 8) is fed into a deep spectral CNN (e.g. as depicted at 808 in FIG. 8). The deep spectral CNN operates to determine whether a band or bands within the spectrogram are occupied. If it is determined that areas of the spectrogram are occupied, it can then trigger the further processing of the spectrogram. In particular, a second, or channel quality CNN (e.g. as depicted at 812 in FIG. 8) operates to generate a heat map (e.g. as depicted at 816 in FIG. 8) that identifies occupied portions of the RF spectrum. In parallel or in series to the processing by the second CNN, the spectrogram is fed into a third, for occupied bandwidth CNN (e.g. as depicted at 820 in FIG. 8), which operates to generate a frequency mask (e.g. as depicted at 824 in FIG. 8) that masks or blocks areas of the RF spectrum determined to be unusable. The outputs from the first, second, and third is CNN's of and provided to the decision logic (e.g. as depicted at 828 in FIG. 8), from which software defined radio (SDR) parameters are output.

As can be appreciated by one of skill in the art after consideration of the present disclosure, CNNs or other DNNs are utilized to enable configurable RF devices to identify usable portions of the RF spectrum. Moreover, the use of one or more CNNs as disclosed herein enables such processes to be performed with high sensitivity, enables efficient use of the RF spectrum, and prevents interference between pairs of communicating RF devices. In addition, in accordance with the least some embodiments of the present disclosure, multiple CNN's are implemented on a single device, and they can be executed in ways that enable even devices having relatively less powerful processing capabilities to implement them. For instance, a first CNN can operate to make an initial determination, with high sensitivity, as to whether a portion or portions of the RF spectrum are occupied. If this process determines that relevant portions of the RF spectrum are occupied, then additional CNN's for determining the quality of potential areas of the RF spectrum available for further transmission, and for creating a mask of areas of the RF spectrum that are not available, can be executed. In accordance with at least some embodiments of the present disclosure, these further CNN's are executed in parallel.

Embodiments of the present disclosure have particular application to configurable or agile RF communication systems, such as current and upcoming satellite communication standards, cellular communication standards, including but not limited to 5G systems, or the like. Moreover, embodiments of the present disclosure facilitate the effective use of MIMO communication devices, by providing techniques for selecting RF transmission parameters that can be performed by a transmitting or prospectively transmitting device itself, including devices having relatively limited processing capabilities, such as, but not limited to, mobile telephones.

In accordance with at least some embodiments of the present disclosure, the technology encompasses:

(1) A method for analyzing spectrum, comprising:
generating an RF spectrogram; and
analyzing the RF spectrogram using a first deep neural network (DNN) to identify occupied portions of the RF spectrum.

(2) The method of (1), further comprising:
determining whether a portion of the RF spectrum is occupied;
in response to determining that the portion of the RF spectrum is occupied, analyzing the RF spectrum using a second DNN to identify at least one of occupied but nonetheless usable portions of the RF spectrum, and identifying unusable portions of the RF spectrum.

(3) The method of (1), further comprising:
determining whether a portion of the RF spectrum is occupied:
in response to determining that the portion of the RF spectrum is analyzed, analyzing the RF spectrum using a second DNN to identify at least one of occupied but nonetheless usable portions of the RF spectrum, and analyzing the RE spectrum using a third DNN to identify unusable portions of the RF spectrum.

(4) The method of (3), wherein the result of analyzing the RF spectrum using a second DNN to identify at least one of occupied but nonetheless usable portions of the RF spectrum is a heat map.

(5) The method of (3) or (4), wherein the result of analyzing the RF spectrum using a third DNN to identify unusable portions of the RF spectrum is a mask.

(6) The method of any of (3) to (5), wherein analyzing the RF spectrum using a second DNN to identify at least one of occupied but nonetheless usable portions of the RF and analyzing the RF spectrum using a third DNN to identify unusable portions of the RF spectrum are performed in parallel.

(7) The method of any of (1) to (6), further comprising executing an application for implementing the DNN that analyzes the RF spectrum on a configurable RF device.

(8) The method of any of (2) to (7), further comprising:
configuring parameters of the RF device using the results of the analyses.

(9) The method of (8), further comprising:
outputting an RF signal using the parameters.

(10) The method of any of (7) to (9), wherein the configurable RF device is a cognitive radio.

(11) The method of any of (7) to (9), wherein the configurable RF device is a mobile telephone.

In accordance with further aspects of the present disclosure, the technology encompasses:

(12) A radio frequency (RF) device, comprising:
an antenna;
a processor;
memory;
application programming stored in the memory and executed by the processor, wherein the application programming implements a first deep neural network operable to perform spectral sensing of an RF spectrum received by the antenna of the RF device.

(13) The RF device of (12), wherein the application programming implements an additional deep neural network operable to determine at least one of channel quality metrics of the RF spectrum and occupied channel identification within the RF spectrum.

(14) The RF device of (13), wherein the application programming implements a second deep neural network operable to determine at least one of channel quality metrics of the RF spectrum, and wherein the application programming implements a third deep neural network operable to identify occupied channels within the RF spectrum.

(15) The RF device of any of (12) to (14), wherein the device is a configurable RF device.

(16) The RF device of any of (12) to (15), wherein the device has a plurality of configurable radio parameters, and wherein at least some of the parameters are set in response to outputs of at least one of the configurable neural networks executed on the device.

(17) The RF device of any of (12) to (16), wherein the device includes a radio transceiver connected to a plurality of antennas.

(18) The RF device of any of (12) to (17), wherein the device includes a plurality of antennas, and wherein at least one of the configurable parameters is selecting antenna for use in transmitting a signal.

(19) The RF device of any of (12) to (18), wherein the device is a mobile telephone.

In accordance with still further embodiments of the present disclosure, the technology encompasses:

(20) A method of analyzing a radio frequency (RF) spectrum, comprising:
receiving RF signals;
transforming the received RF signals into a spectrogram;
analyzing the spectrogram using a first deep neural network (DNN) to determine the presence of signals;
in response to determining that signals are present, analyzing the spectrogram:
in a second DNN to determine an occupancy of the spectrum; and
in a third DNN to determine unusable areas of the spectrum;
setting a radio parameter in response to the output of at least one of the DNNs; and
transmitting a signal using the radio parameter.

The foregoing discussion has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method for analyzing spectrum, comprising:
generating a first radio frequency (RF) spectrogram of an RF spectrum;
analyzing the first RF spectrogram using a first deep neural network (DNN) to provide a first output that identifies occupied portions of the RF spectrum; and
analyzing the first RF spectrogram using a second DNN to provide a second output that identifies occupied but nonetheless usable portions of the RF spectrum, wherein the first DNN is different than the second DNN.

2. The method of claim 1, further comprising:
in response to determining that at least a portion of the RF spectrum is occupied, analyzing the first RF spectrogram using a third DNN to provide a third output that identifies unusable portions of the RF spectrum.

3. The method of claim 2, wherein the output resulting from analyzing the first RF spectrogram using a second DNN to identify at least one of occupied but nonetheless usable portions of the RF spectrum is a heat map.

4. The method of claim 3, wherein the output resulting from analyzing the first RF spectrogram using a third DNN to identify unusable portions of the RF spectrum is a mask.

5. The method of claim 2, wherein analyzing the first RF spectrogram using a second DNN to identify at least one of occupied but nonetheless usable portions of the RF spectrum and analyzing the first RF spectrogram using a third DNN to identify unusable portions of the RF spectrum are performed in parallel.

6. The method of claim 5, further comprising executing an application for implementing the DNN that analyzes the first RF spectrogram on a configurable RF device.

7. The method of claim 6, further comprising:
configuring parameters of the configurable RF device using the results of the analyses.

8. The method of claim 7, further comprising:
outputting an RF signal using the parameters.

9. The method of claim 8, wherein the configurable RF device is a cognitive radio.

10. The method of claim 8, wherein the configurable RF device is a mobile telephone.

11. A radio frequency (RF) device, comprising:
an antenna;
a processor;
memory;
application programming stored in the memory and executed by the processor, wherein the application programming implements:
a transform that generates a first time-frequency spectrogram from an RF spectrum received by the antenna;
a first deep neural network operable to identify occupied portions of the RF spectrum from the first time-frequency spectrogram; and
a second deep neural network operable to determine at least one of channel quality metrics of the RF spectrum or occupied channel identification within the RF spectrum from the first time-frequency spectrogram.

12. The RF device of claim 11, wherein the application programming implements a third deep neural network operable to identify unusable portions of the RF spectrum from the first time-frequency spectrogram.

13. The RF device of claim 12, wherein the device is a configurable RF device.

14. The RF device of claim 13, wherein the device has a plurality of configurable radio parameters, wherein the deep neural networks are configurable neural networks, and wherein at least some of the configurable radio parameters are set in response to outputs of at least one of the configurable neural networks executed on the device.

15. The RF device of claim 14, wherein the device includes a radio transceiver connected to a plurality of antennas.

16. The RF device of claim 14, wherein the device includes a plurality of antennas, and wherein at least one of the configurable radio parameters is selecting an antenna for use in transmitting a signal.

17. The RF device of claim 16, wherein the device is a mobile telephone.

18. A method of analyzing a radio frequency (RF) spectrum, comprising:
receiving RF signals;
transforming the received RF signals into a first spectrogram;
analyzing the first spectrogram using a first deep neural network (DNN) to determine the presence of signals;
in response to determining that signals are present, analyzing the first spectrogram:
in a second DNN to determine an occupancy of the spectrum; and
in a third DNN to determine unusable areas of the spectrum;

setting a radio parameter in response to an output of at least one of the DNNs; and transmitting a signal using the radio parameter.

19. The method of claim 18, wherein the second and third DNNs analyze the first spectrogram in parallel.

20. The RF device of claim 12, wherein the second, and third deep neural networks analyze the spectrogram in parallel.

\* \* \* \* \*